(12) United States Patent
Oto

(10) Patent No.: US 8,995,761 B2
(45) Date of Patent: *Mar. 31, 2015

(54) IMAGE PROCESSING APPARATUS, IMAGE PROCESSING METHOD, AND COMPUTER-READABLE MEDIUM

(75) Inventor: Hiroshi Oto, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/453,843

(22) Filed: Apr. 23, 2012

(65) Prior Publication Data

US 2012/0287488 A1 Nov. 15, 2012

(30) Foreign Application Priority Data

May 9, 2011 (JP) ................................ 2011-104742

(51) Int. Cl.
G06K 9/34 (2006.01)
H04N 1/409 (2006.01)
H04N 1/64 (2006.01)

(52) U.S. Cl.
CPC .............. *H04N 1/409* (2013.01); *H04N 1/644* (2013.01)
USPC ......................................... 382/164

(58) Field of Classification Search
None
See application file for complete search history.

(56) References Cited

U.S. PATENT DOCUMENTS

| | | | |
|---|---|---|---|
| 5,872,864 A * | 2/1999 | Imade et al. ................. | 382/176 |
| 6,128,407 A * | 10/2000 | Inoue et al. .................. | 382/167 |
| 6,404,921 B1 * | 6/2002 | Ishida ........................... | 382/197 |
| 6,784,896 B1 * | 8/2004 | Perani et al. ................. | 345/589 |
| 7,038,697 B2 * | 5/2006 | Gangnet et al. .............. | 345/606 |
| 7,304,648 B2 * | 12/2007 | Beaumont et al. ............ | 345/589 |
| 7,366,635 B1 * | 4/2008 | Gupta et al. .................. | 702/150 |
| 7,427,994 B2 * | 9/2008 | Gangnet et al. .............. | 345/606 |
| 7,623,712 B2 * | 11/2009 | Dai et al. ...................... | 382/180 |
| 7,689,060 B2 * | 3/2010 | Messina et al. .............. | 382/276 |
| 7,903,307 B2 * | 3/2011 | Dai et al. ...................... | 358/540 |
| 7,936,929 B2 * | 5/2011 | Dai et al. ...................... | 382/225 |

(Continued)

FOREIGN PATENT DOCUMENTS

| | | |
|---|---|---|
| CN | 101901343 A | 12/2010 |
| JP | 2001-022928 A | 1/2001 |

(Continued)

OTHER PUBLICATIONS

Orzan et al. "Structure-preserving manipulation of photographs" 2007.*

(Continued)

*Primary Examiner* — Vu Le
*Assistant Examiner* — Alexander J Lesnick
(74) *Attorney, Agent, or Firm* — Fitzpatrick, Cella, Harper & Scinto

(57) ABSTRACT

An image processing apparatus comprises: a division unit configured to divide an input image into a plurality of color regions based on a color difference; a color gradient information calculation unit configured to calculate color gradient information at a boundary between the divided color regions from color information of the input image; an attribute determination unit configured to determine a gradation attribute representing a characteristic of a color gradient at the boundary using the color gradient information; and a vectorization target determination unit configured to determine, based on the gradation attribute of the boundary determined by the attribute determination unit, whether the input image is a vectorization target.

9 Claims, 21 Drawing Sheets

(56) References Cited

U.S. PATENT DOCUMENTS

| | | | |
|---|---|---|---|
| 8,023,147 B2 | 9/2011 | Dai et al. | 358/1.18 |
| 8,055,065 B2 * | 11/2011 | Allen | 382/162 |
| 8,125,679 B2 | 2/2012 | Dai et al. | 358/1.18 |
| 8,229,214 B2 * | 7/2012 | Fukuoka et al. | 382/164 |
| 8,290,256 B2 * | 10/2012 | Kitago | 382/164 |
| 8,300,939 B2 * | 10/2012 | Naito | 382/177 |
| 8,369,621 B2 * | 2/2013 | Nomura | 382/190 |
| 8,369,637 B2 * | 2/2013 | Ishida | 382/243 |
| 8,395,813 B2 * | 3/2013 | Yago | 358/1.9 |
| 8,411,990 B1 * | 4/2013 | Hadap et al. | 382/274 |
| 8,422,774 B2 * | 4/2013 | Tsunematsu | 382/164 |
| 8,442,314 B2 * | 5/2013 | Kitago | 382/167 |
| 2004/0227767 A1 * | 11/2004 | Baroncelli et al. | 345/589 |
| 2005/0180635 A1 * | 8/2005 | Trifonov et al. | 382/199 |
| 2007/0086667 A1 * | 4/2007 | Dai et al. | 382/242 |
| 2007/0147700 A1 * | 6/2007 | Jeong et al. | 382/266 |
| 2008/0212873 A1 | 9/2008 | Allen | |
| 2009/0040246 A1 * | 2/2009 | Miyasaka | 345/698 |
| 2009/0324065 A1 * | 12/2009 | Ishida et al. | 382/164 |
| 2010/0054587 A1 * | 3/2010 | Fukuoka et al. | 382/164 |
| 2010/0097656 A1 * | 4/2010 | Misawa et al. | 358/2.1 |
| 2010/0124361 A1 * | 5/2010 | Gaddy | 382/107 |
| 2010/0158360 A1 * | 6/2010 | Dai | 382/164 |
| 2010/0174977 A1 * | 7/2010 | Mansfield et al. | 715/234 |
| 2010/0183225 A1 * | 7/2010 | Vantaram et al. | 382/173 |
| 2010/0225984 A1 * | 9/2010 | Niina et al. | 358/538 |
| 2010/0232717 A1 * | 9/2010 | Matsuguma et al. | 382/224 |
| 2010/0259541 A1 * | 10/2010 | Kitago | 345/423 |
| 2011/0019927 A1 * | 1/2011 | Nagamatsu | 382/225 |
| 2011/0069881 A1 * | 3/2011 | Kitago | 382/164 |
| 2012/0011142 A1 * | 1/2012 | Baheti et al. | 707/769 |
| 2012/0093401 A1 * | 4/2012 | Tsunematsu | 382/165 |
| 2012/0113098 A1 * | 5/2012 | Hu et al. | 345/419 |
| 2012/0114230 A1 * | 5/2012 | Dai et al. | 382/164 |
| 2012/0287488 A1 * | 11/2012 | Oto | 358/505 |
| 2012/0288188 A1 * | 11/2012 | Oto | 382/164 |

FOREIGN PATENT DOCUMENTS

| | | |
|---|---|---|
| JP | 2006-344069 | 12/2006 |
| JP | 2007-066070 A | 3/2007 |
| JP | 2007-158725 | 6/2007 |
| JP | 2007-272456 | 10/2007 |
| JP | 2009-508239 | 2/2009 |
| JP | 2010-056691 A | 3/2010 |
| JP | 2010-146218 | 7/2010 |
| WO | 2007/033429 | 3/2007 |

OTHER PUBLICATIONS

Orzan et al. "Diffusion Curves: A Vector Representation for Smooth-Shaded Images" 2008.*

Sun et al. "Image Vectorization using Optimized Gradient Meshes" 2007.*

U.S. Appl. No. 13/450,348, filed Apr. 18, 2012 by Hiroshi Oto.

Chinese Office Action dated Sep. 24, 2014 for counterpart Chinese Patent Application No. 201210143526.6.

* cited by examiner

FIG. 3

| BOUNDARY | LABEL A | LABEL B | BOUNDARY LENGTH | UPPER COLOR GRADIENT | LOWER COLOR GRADIENT | RIGHT COLOR GRADIENT | LEFT COLOR GRADIENT | AVERAGE COLOR GRADIENT |
|---|---|---|---|---|---|---|---|---|
| ... | ... | ... | ... | ... | ... | ... | ... | ... |
| n | 1 | 3 | 6 | 1200 | 0 | 0 | 0 | 200 |
| ... | ... | ... | ... | ... | ... | ... | ... | ... |

FIG. 13

| BOUNDARY | LABEL A | LABEL B | BOUNDARY LENGTH | UPPER COLOR GRADIENT | LOWER COLOR GRADIENT | RIGHT COLOR GRADIENT | LEFT COLOR GRADIENT | AVERAGE COLOR GRADIENT | BOUNDARY ATTRIBUTE |
|---|---|---|---|---|---|---|---|---|---|
| 1 | 1 | 2 | 300 | 23000 | 22000 | 21000 | 24000 | 300 | EDGE |
| 2 | 2 | 3 | 200 | 1200 | 900 | 1100 | 800 | 20 | RADIAL GRADATION |
| 3 | 2 | 4 | 100 | 400 | 350 | 350 | 400 | 15 | RADIAL GRADATION |
| 4 | 3 | 5 | 80 | 10000 | 10000 | 0 | 4000 | 300 | EDGE |
| 5 | 1 | 6 | 120 | 8000 | 8000 | 0 | 8000 | 200 | EDGE |
| 6 | 1 | 7 | 80 | 6000 | 6000 | 6000 | 0 | 150 | EDGE |
| 7 | 1 | 8 | 40 | 3000 | 2500 | 2500 | 0 | 100 | EDGE |
| 8 | 5 | 6 | 80 | 0 | 0 | 800 | 0 | 20 | LINEAR GRADATION |
| 9 | 6 | 7 | 40 | 0 | 0 | 1200 | 0 | 15 | LINEAR GRADATION |
| 10 | 7 | 8 | 40 | 0 | 0 | 720 | 0 | 18 | LINEAR GRADATION |

FIG. 14

| GRADATION CLUSTER | LABEL | BOUNDARY | TYPE | GRADIENT ANGLE |
|---|---|---|---|---|
| 1 | 2, 3, 4 | 2, 3 | RADIAL | INITIAL VALUE |
| 2 | 5, 6, 7, 8 | 8, 9, 10 | LINEAR | 0 |

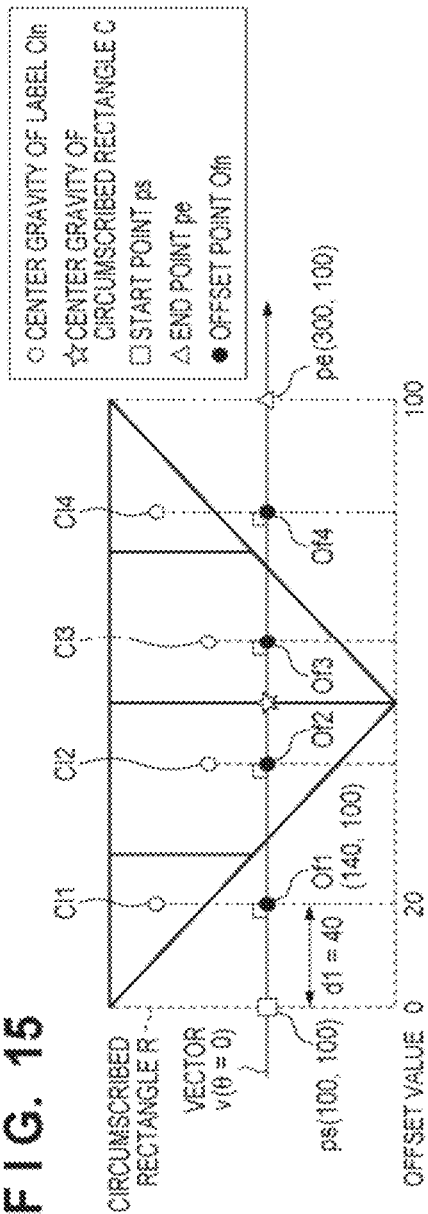

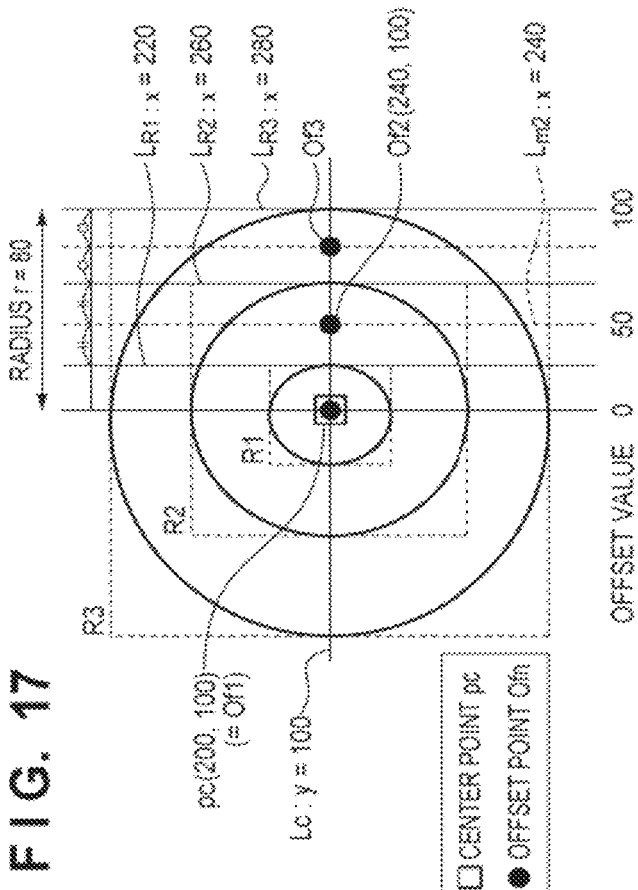

F I G. 19
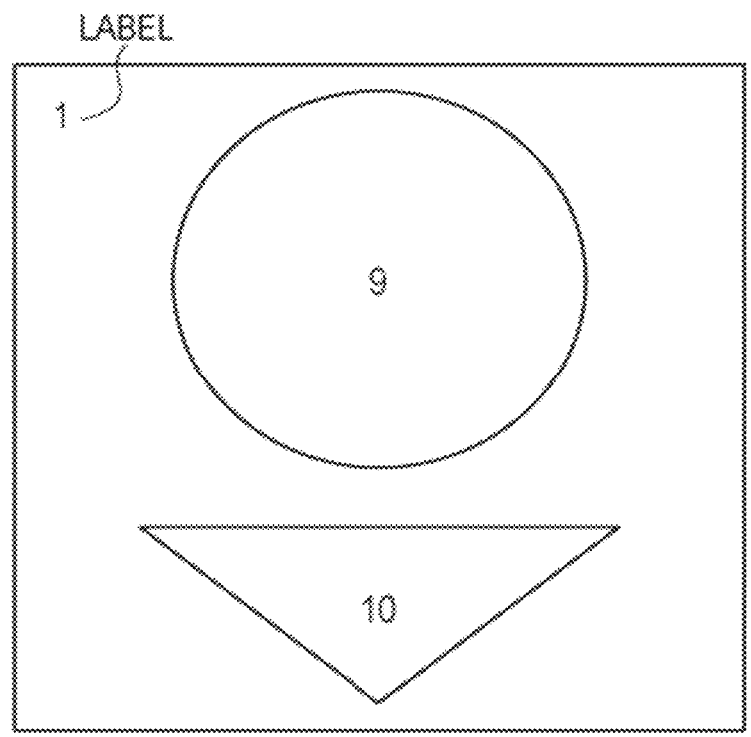

FIG. 21
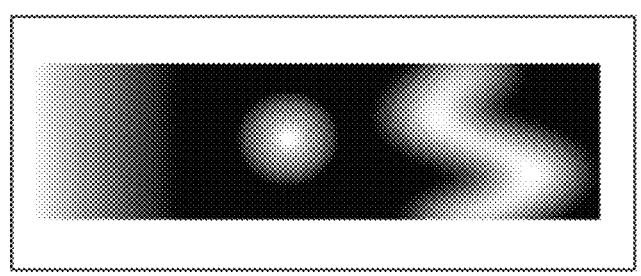
INPUT IMAGE
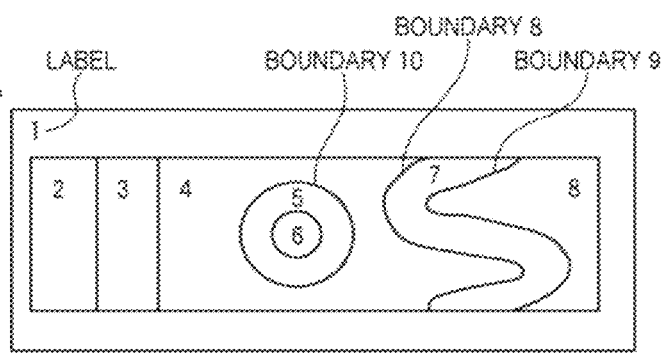
COLOR REGION IDENTIFICATION RESULT
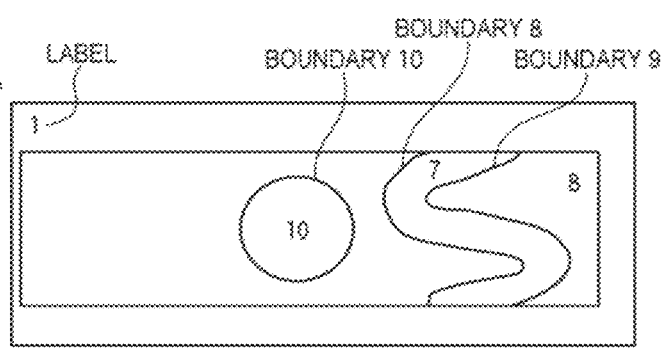
COLOR REGION INTEGRATION RESULT

FIG. 22

| BOUNDARY | LABEL A | LABEL B | BOUNDARY LENGTH | ... | BOUNDARY ATTRIBUTE |
|---|---|---|---|---|---|
| 1 | 1 | 2 | 200 | ... | EDGE |
| 2 | 1 | 3 | 100 | ... | EDGE |
| 3 | 1 | 4 | 500 | ... | EDGE |
| 4 | 1 | 7 | 100 | ... | EDGE |
| 5 | 1 | 8 | 200 | ... | EDGE |
| 6 | 2 | 3 | 100 | ... | LINEAR GRADATION |
| 7 | 3 | 4 | 100 | ... | LINEAR GRADATION |
| 8 | 4 | 7 | 250 | ... | COMPLEX GRADATION |
| 9 | 7 | 8 | 250 | ... | COMPLEX GRADATION |
| 10 | 4 | 5 | 200 | ... | RADIAL GRADATION |
| 11 | 5 | 6 | 100 | ... | RADIAL GRADATION |

FIG. 23

| GRADATION CLUSTER | LABEL | BOUNDARY | TYPE | GRADIENT ANGLE |
|---|---|---|---|---|
| 1 | 2, 3, 4 | 6, 7 | LINEAR | 0 |
| 2 | 5, 6 | 11 | RADIAL | INITIAL VALUE |

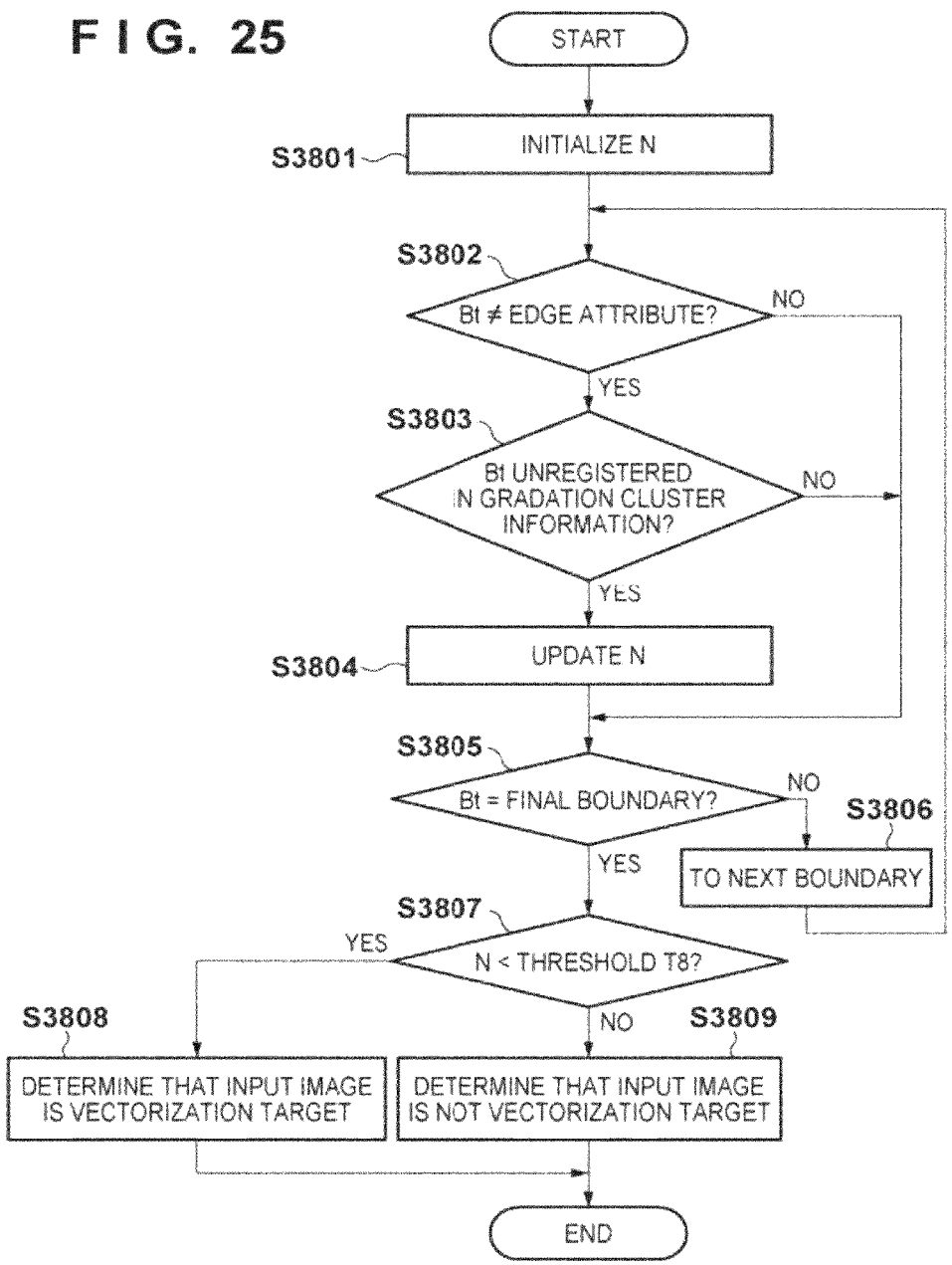

IMAGE PROCESSING APPARATUS, IMAGE PROCESSING METHOD, AND COMPUTER-READABLE MEDIUM

BACKGROUND OF THE INVENTION

1. Field of the Invention

The present invention relates to an image processing apparatus, image processing method, and computer-readable medium. Particularly, the present invention relates to an image processing technique of determining whether an input image containing a gradation is a vectorization target.

2. Description of the Related Art

Recently, an opportunity to use one image information in different devices is growing. This boosts demands for higher compression ratios to reduce transmission cost between devices and higher image qualities to cope with a resolution difference between devices. User friendliness requires editability so that an image can be partially edited again. Under the circumstance, a vectorization technique is needed to convert an image expressed in the raster format into a vector format capable of easy re-editing regardless of the resolution.

Japanese Patent Laid-Open No. 2006-344069 discloses a vectorization technique for an image in which the color difference is clear, such as an illustration or clip art. In this method, an image is input, and the number of colors of the input image is reduced using color similarity. The contour line of each obtained color region is extracted and approximated by a function, and vector data is output in addition to color information.

Japanese Patent Laid-Open No. 2007-272456 discloses a vectorization method for an image containing a linear gradation or radial gradation. In this method, the color gradient between pixels in an image is calculated, a gradation region is determined using the result, and a path having pixels of almost the same color is generated for the obtained gradation region. A perpendicular to the path is defined, a representative color value is calculated on the perpendicular, and vectorization is executed.

However, when an image accompanied by a complicated color change, such as a photograph, is input and vectorized by the above technique, the vectorization leads to poor image quality, low compression ratio, long processing time, and the like. To prevent this, Japanese Patent Laid-Open No. 2007-158725 discloses a technique of determining whether an input image is a vectorization target. In this method, an input image is clustered by color quantization, and whether the input image is a vectorization target is determined using the number of obtained clusters and the variance of color within a region in the cluster. However, this method uses the variance of color to determine whether an input image is a vectorization target. Thus, even an image formed from only a gradation region capable of vectorization by the technique as disclosed in Japanese Patent Laid-Open No. 2007-272456 is determined as a photographic region.

Japanese Patent Laid-Open No. 2010-146218 discloses another method of determining whether an input image is a vectorization target. In this method, an input image is clustered by color quantization, labeling is executed to obtain a connected region on the obtained cluster map, and whether the input image is a vectorization target is determined using the number of obtained labels and the number of pixels within a label. This method can determine an image in which many small regions are generated, but cannot determine whether an input image containing a gradation is a vectorization target.

Hence, a technique of determining whether a gradation region in an image is a vectorization target has not been proposed.

The present invention has been made to solve the above problems, and determines whether an input image containing a gradation is a vectorization target.

SUMMARY OF THE INVENTION

According to one aspect of the present invention, there is provided an image processing apparatus comprising: a division unit configured to divide an input image into a plurality of color regions based on a color difference; a color gradient information calculation unit configured to calculate color gradient information at a boundary between the divided color regions from color information of the input image; an attribute determination unit configured to determine a gradation attribute representing a characteristic of a color gradient at the boundary using the color gradient information; and a vectorization target determination unit configured to determine, based on the gradation attribute of the boundary determined by the attribute determination unit, whether the input image is a vectorization target.

According to another aspect of the present invention, there is provided an image processing method comprising: a division step of dividing an input image into a plurality of color regions based on a color difference; a color gradient information calculation step of calculating color gradient information at a boundary between the divided color regions from color information of the input image; an attribute determination step of determining a gradation attribute representing a characteristic of a color gradient at the boundary using the color gradient information; and a vectorization target determination step of determining, based on the gradation attribute of the boundary determined in the attribute determination step, whether the input image is a vectorization target.

The present invention can determine whether an input image containing a gradation is a vectorization target (that is, whether an input image is an image suited to vectorization).

Further features of the present invention will become apparent from the following description of exemplary embodiments (with reference to the attached drawings).

BRIEF DESCRIPTION OF THE DRAWINGS

FIG. 3 is a table exemplifying boundary color gradient information according to the first embodiment;

FIG. 13 is a table showing boundary color gradient information and a boundary attribute in FIG. 12 according to the first embodiment;

FIG. 14 is a table showing gradation cluster information in FIG. 12 according to the first embodiment;

FIG. 15 is a conceptual view showing generation of linear gradation parameters according to the first embodiment;

FIG. 16 is a table showing an example of linear gradation parameters according to the first embodiment;

FIG. 17 is a conceptual view showing generation of radial gradation parameters according to the first embodiment;

FIG. 18 is a table showing an example of radial gradation parameters according to the first embodiment;

FIG. 19 is a view showing an example of a new color region identification result after color region integration processing according to the first embodiment;

FIG. 21 is a view showing an example in which a remaining pseudo contour is generated according to the first embodiment;

FIG. 22 is a table showing boundary color gradient information and a boundary attribute in FIG. 21 according to the first embodiment;

FIG. 23 is a table showing gradation cluster information in FIG. 21 according to the first embodiment;

FIG. 25 is a flowchart showing a vectorization target determination processing sequence according to the third embodiment.

DESCRIPTION OF THE EMBODIMENTS

First Embodiment

Embodiments of the present invention will now be described with reference to the accompanying drawings. Building components set forth in these embodiments are merely examples. The technical scope of the present invention should be determined by the appended claims and is not limited to the individual embodiments to be described below.

[Apparatus Arrangement]

Figure 2:
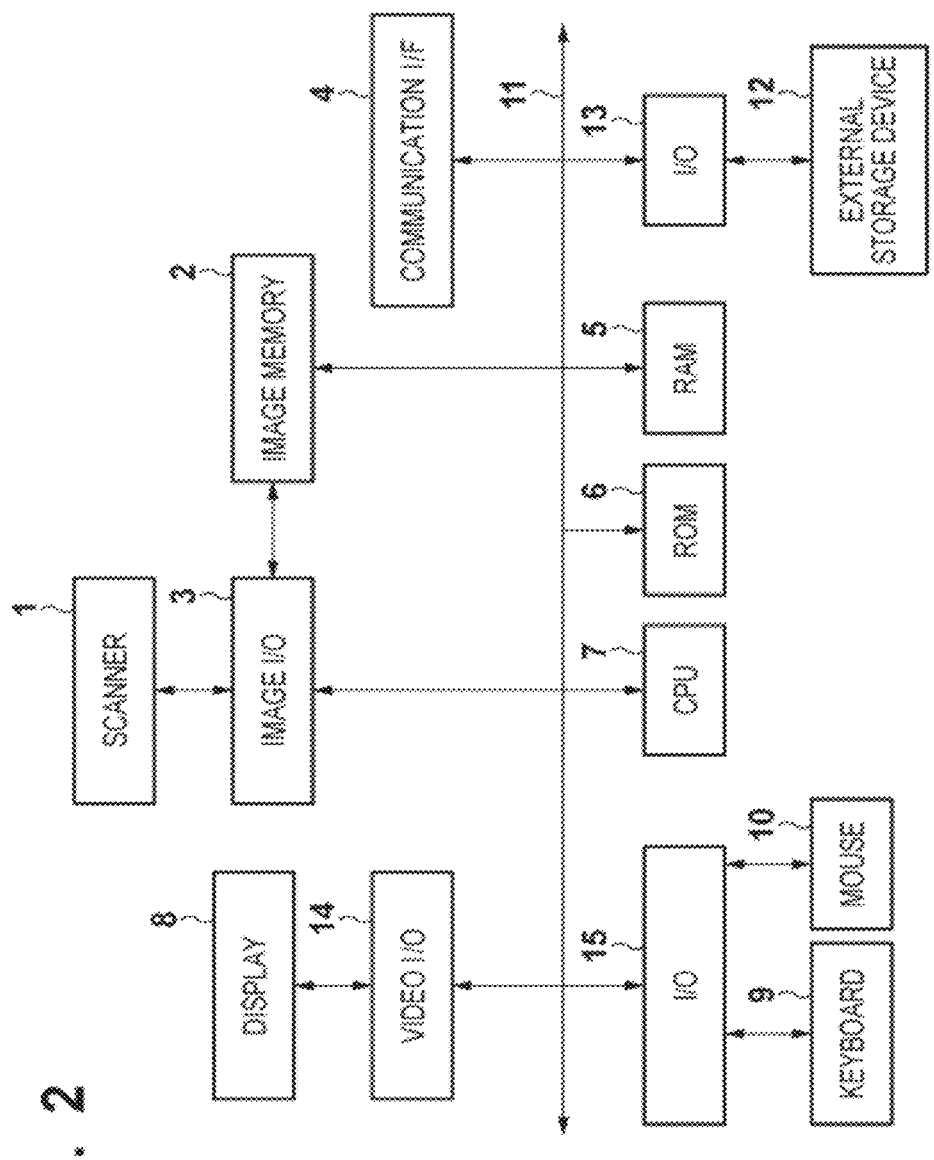
FIG. 2 is a block diagram showing the arrangement of the image processing apparatus.

The arrangement of an image processing apparatus according to the embodiment will be explained with reference to the block diagram of FIG. 2. Referring to FIG. 2, a CPU (Central Processing Unit) 7 controls the overall apparatus. A ROM (Read Only Memory) 6 stores programs and parameters which need not be changed. A RAM (Random Access Memory) 5 temporarily stores programs and data which are supplied from an external apparatus and the like. A scanner 1 photoelectrically scans a document and the like to obtain electronic image data as input data. An image input/output (I/O) 3 connects the scanner 1 and the image processing apparatus. An image memory 2 holds image data and the like read by the scanner 1. An external storage device 12 includes a hard disk and memory card which are fixedly installed, or a detachable optical disk, magnetic card, optical card, IC card, and memory card such as a flexible disk (FD) and CD (Compact Disk). An I/O 13 is an input/output interface between the external storage device 12 and a computer apparatus. An I/O 15 is an input/output interface with an input device including a pointing device 10 (for example, mouse) and a keyboard 9 which receive user operations and input data. A video I/O 14 is an input/output interface with a display monitor 8 for displaying data held in the image processing apparatus and supplied data. A communication I/F 4 is an interface for connecting to a network line such as the Internet. A system bus 11 connects the respective units in the image processing apparatus communicably.

[Processing Sequence]

A processing sequence to implement the present invention by a program running on the CPU 7 will be explained with reference to the flowchart of FIG. 1.

Figure 1:
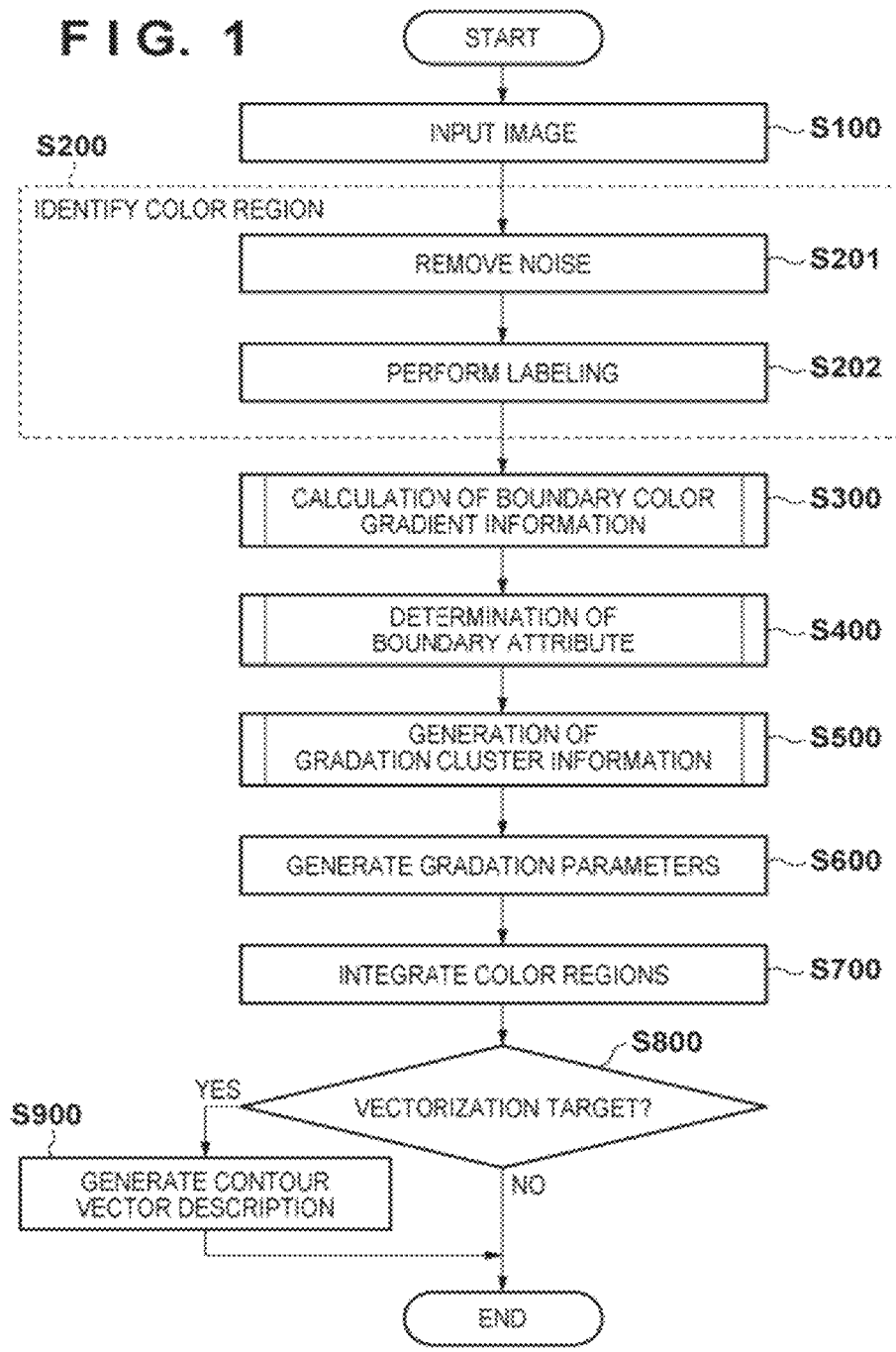
FIG. 1 is a flowchart showing main processing by an image processing apparatus.

In the flowchart of FIG. 1, the process starts in step S100, and image data containing an image region to be processed is input. As for the image input, image data read by the scanner 1 in FIG. 2 is input to the image memory 2 via the image I/O 3. An image containing an image region to be processed may be input outside from the apparatus via the communication I/F 4. Alternatively, image data stored in advance in the external storage device 12 may be read via the I/O 13. The obtained input image is held in the image memory 2.

[Color Region Identification Processing]

Color region identification processing in step S200 is performed for the read image data. When an input unit such as a scanner is used, noise may be superposed on an input image and make it difficult to specify a representative color. In this case, by performing subtractive color processing, the input image can be divided into a plurality of color regions as regions of the same color so that pixels with a small color difference have the same color information at once. In step S201, the above problem can be solved by executing subtractive color processing for the input image in step S201. For example, the method disclosed in Japanese Patent Laid-Open No. 2006-344069 removes scan noise by forming clusters from pixels in an input image based on color information and integrating similar clusters or clusters considered to be noise. By applying this method, noise generated in a scanned image input or the like can be removed. Note that another method is usable as the noise removal method.

In step S202, a color region is extracted by labeling processing. In labeling processing, the same number (identification information) is assigned to a set of pixels to be connected with the same value. Labeling processing is often used as pre-processing for acquiring information (area and shape) of each color region. In this case, an identification number, that is, a label is assigned so that a color region can be identified in subsequent processing. Color region identification processing (step S200) in FIG. 1 are implemented by steps S201 and S202.

[Boundary Color Gradient Information Calculation Processing]

In step S300, boundary color gradient information calculation processing is performed based on the color region identification result in step S200. In this case, boundary information and color gradient information are obtained for each color region boundary, as shown in FIG. 3. In the following description, information shown in FIG. 3 will be referred to as "boundary color gradient information". As shown in FIG. 3, the boundary color gradient information includes information about the boundary number, label A and label B which sandwich a boundary (that is, information about two color regions which sandwich the boundary), boundary length, upper, lower, right, and left direction color gradient intensities, and an average color gradient.

Figure 4:
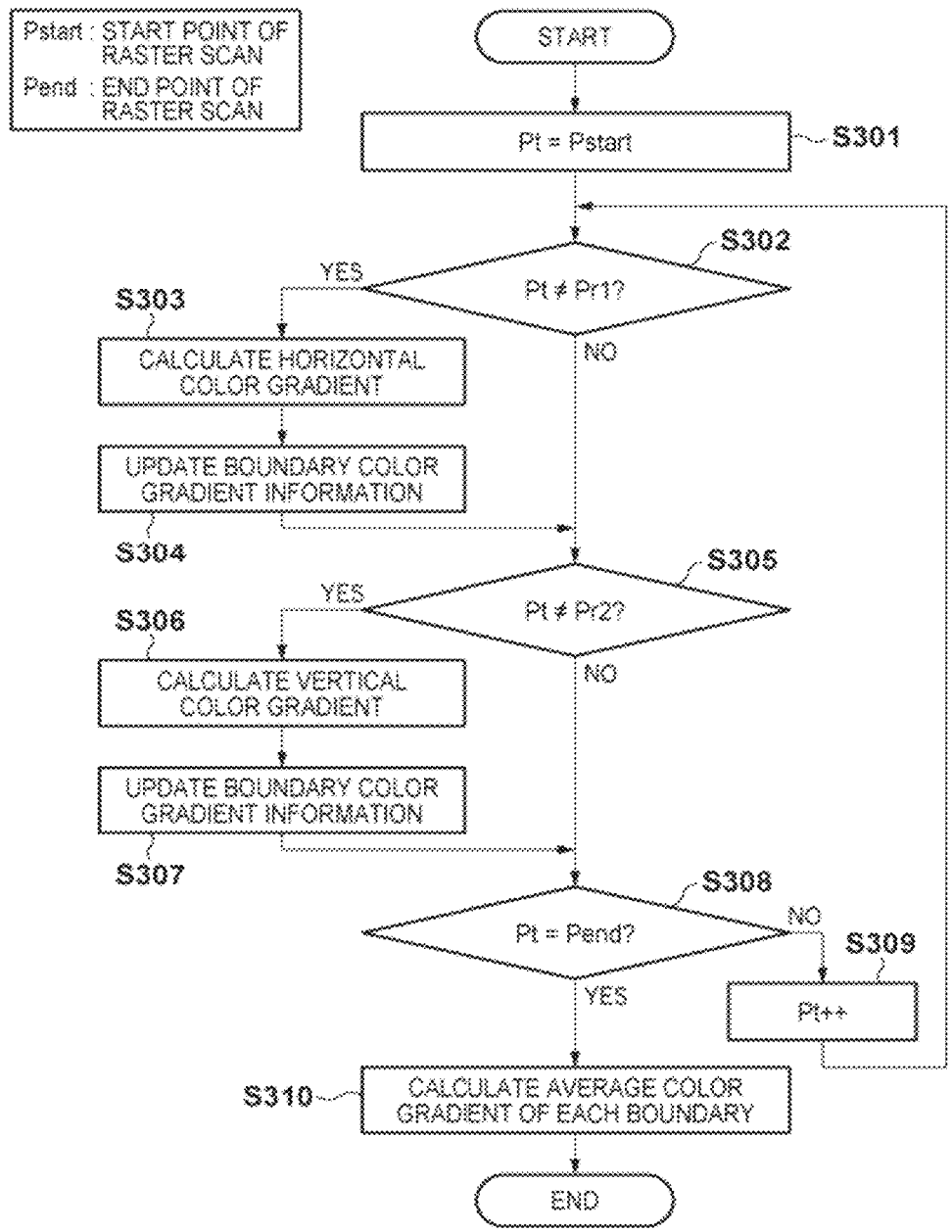
FIG. 4 is a flowchart showing a boundary color gradient information calculation sequence according to the first embodiment.
Figure 5:
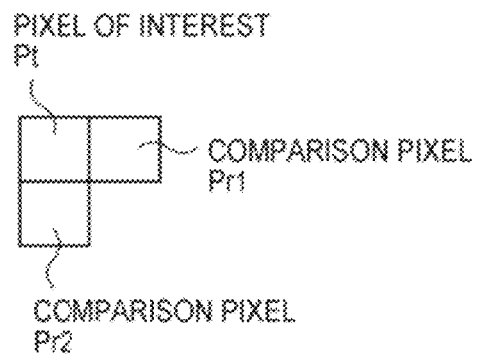
FIG. 5 is a view showing a pixel of interest and comparison pixels when performing raster scan according to the first embodiment.

A detailed sequence in step S300 will be described with reference to FIG. 4. Note that terms in a description of raster scan will be defined. As shown in FIG. 5, Pt is the pixel of interest, Pr1 is a horizontal comparison pixel, and Pr2 is a vertical comparison pixel.

In step S301, the CPU 7 sets Pt at the start point Pstart of raster scan. Here, Pstart is set at an upper left pixel among pixels contained in an input image. In step S302, the CPU 7 determines whether Pt and Pr1 have the same label. If Pt and Pr1 do not have the same label (YES in step S302), the process shifts to step S303; if they have the same label (NO in step S302), to step S305.

Figure 6:
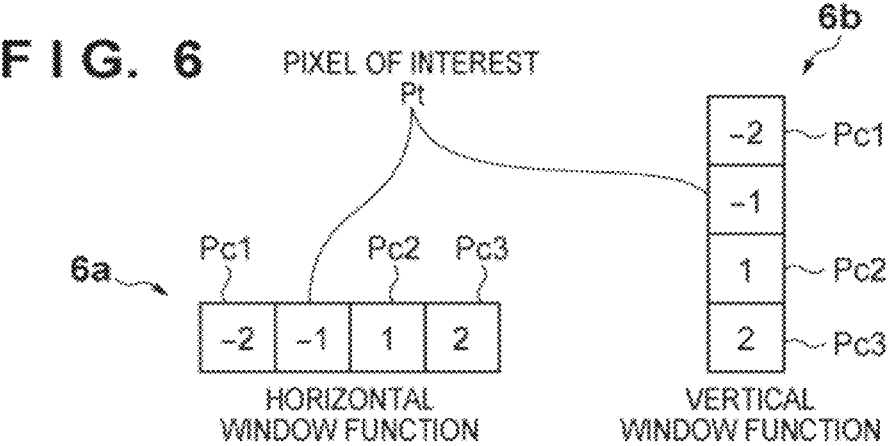
FIG. 6 is a view showing a window function for calculating a color gradient according to the first embodiment.

In step S303, the CPU 7 calculates a horizontal color gradient using a window function. At this time, a color value for calculating a color gradient is acquired from a held input image. Values dr, dg, and db are calculated for the respective R, G, and B values using a window function in 6a of FIG. 6. A value having a maximum absolute value among the calculated values is set as a color gradient dc. For example, (R, G, B) at respective pixel positions in 6a of FIG. 6 have the following values:
Pc1: (30, 20, 10)
Pt: (40, 15, 8)
Pc2: (80, 10, 6)
Pc3: (90, 5, 4)
The window function in 6a of FIG. 6 gives the following values dr, dg, and db:

$$dr = (-2 \times 30) + (-1 \times 40) + (1 \times 80) + (2 \times 90)$$
$$= 160$$
$$dg = (-2 \times 20) + (-1 \times 15) + (1 \times 10) + (2 \times 5)$$
$$= -35$$
$$db = (-2 \times 10) + (-1 \times 8) + (1 \times 6) + (2 \times 4)$$
$$-14$$

In this case, dr has a maximum absolute value, so the color gradient dc is "160". A positive color gradient dc is defined as a left color gradient, and a negative color gradient dc is defined as a right color gradient. The definition may be reversed, as a matter of course. Note that the color value used in color gradient calculation may be one in an arbitrary color space such as the RGB color space or YCC color space. The number of color components used to calculate a color gradient may be limited to one, as exemplified above, or all components may be used for calculation. Another window function or another calculation equation is also available. After the end of this processing, the process shifts to step S304.

In step S304, the CPU 7 updates the boundary color gradient information. First, the CPU 7 compares a combination of two labels which define a currently referred boundary with a combination of labels registered for each boundary in existing boundary color gradient information (FIG. 3), and determines whether the combination has been registered. If the combination has been registered, the CPU 7 increments the boundary length of corresponding boundary color gradient information by one. At this time, the color gradient dc obtained in the preceding step is added to an item corresponding to the direction. In the above-described example, the color gradient dc is 160, the sign is positive, and thus the color gradient dc is added to the left color gradient item. If the combination has not been registered, the CPU 7 generates new boundary color gradient information. More specifically, the CPU 7 writes, in the items of label A and label B in boundary color gradient information, two labels which define a currently referred boundary. Then, the CPU 7 sets 1 in the boundary length and the color gradient dc in an item corresponding to the direction, and initializes all the remaining values to 0. After the end of this processing, the process shifts to step S305.

In step S305, the CPU 7 determines whether Pt and Pr2 have the same label. If Pt and Pr2 do not have the same label (YES in step S305), the process shifts to step S306; if they have the same label (NO in step S305), to step S308.

In step S306, the CPU 7 calculates a vertical color gradient using a window function. For example, the vertical color gradient is calculated using a window function as shown in 6b of FIG. 6. At this time, a color value for calculating a color gradient is obtained from a held input image, similar to step S303. The color gradient is calculated using a vertical window function according to the same sequence as step S303. A positive color gradient dc is defined as an upper color gradient, and a negative color gradient dc is defined as a lower color gradient. The definition may be reversed, as a matter of course. After the end of this processing, the process shifts to step S307.

In step S307, the CPU 7 updates the boundary color gradient information. The update sequence is the same as step S304. After the end of this processing, the process shifts to step S308.

In step S308, the CPU 7 determines whether Pt has reached the end point Pend of raster scan. Here, a lower right pixel among pixels contained in an input image is defined as Pend. If Pt has reached the position of Pend (YES in step S308), the process shifts to step S310; if it has not reached the position of Pend (NO in step S308), to step S309.

In step S309, the CPU 7 shifts Pt by one to change the pixel of interest, and the process returns to step S302.

In step S310, the CPU 7 calculates an average color gradient using the obtained boundary color gradient information. More specifically, the CPU 7 adds the values of all the upper, lower, right, and left color gradients, divides the sum by the boundary length, and substitutes the result into the average color gradient item in the boundary color gradient information. For a boundary n shown in FIG. 3, the average color gradient is (1200+0+0+0)/6=200. As a result, values shown in FIG. 3 can be extracted by the number of boundaries. Steps S301 to S310 implement boundary color gradient information calculation processing (step S300) in FIG. 1.

When no Pr1 is obtained because Pt has reached the right end of an image or when no Pr2 is obtained because Pt has reached the bottom of an image, the process shifts to next processing without performing comparison, which has not been described for simplicity. Also, when pixel values sufficient for the window function are not obtained because Pt has reached an image end, the shape of the window function may be changed or the window function may not be solved.

[Boundary Attribute Determination Processing]

Figure 7:
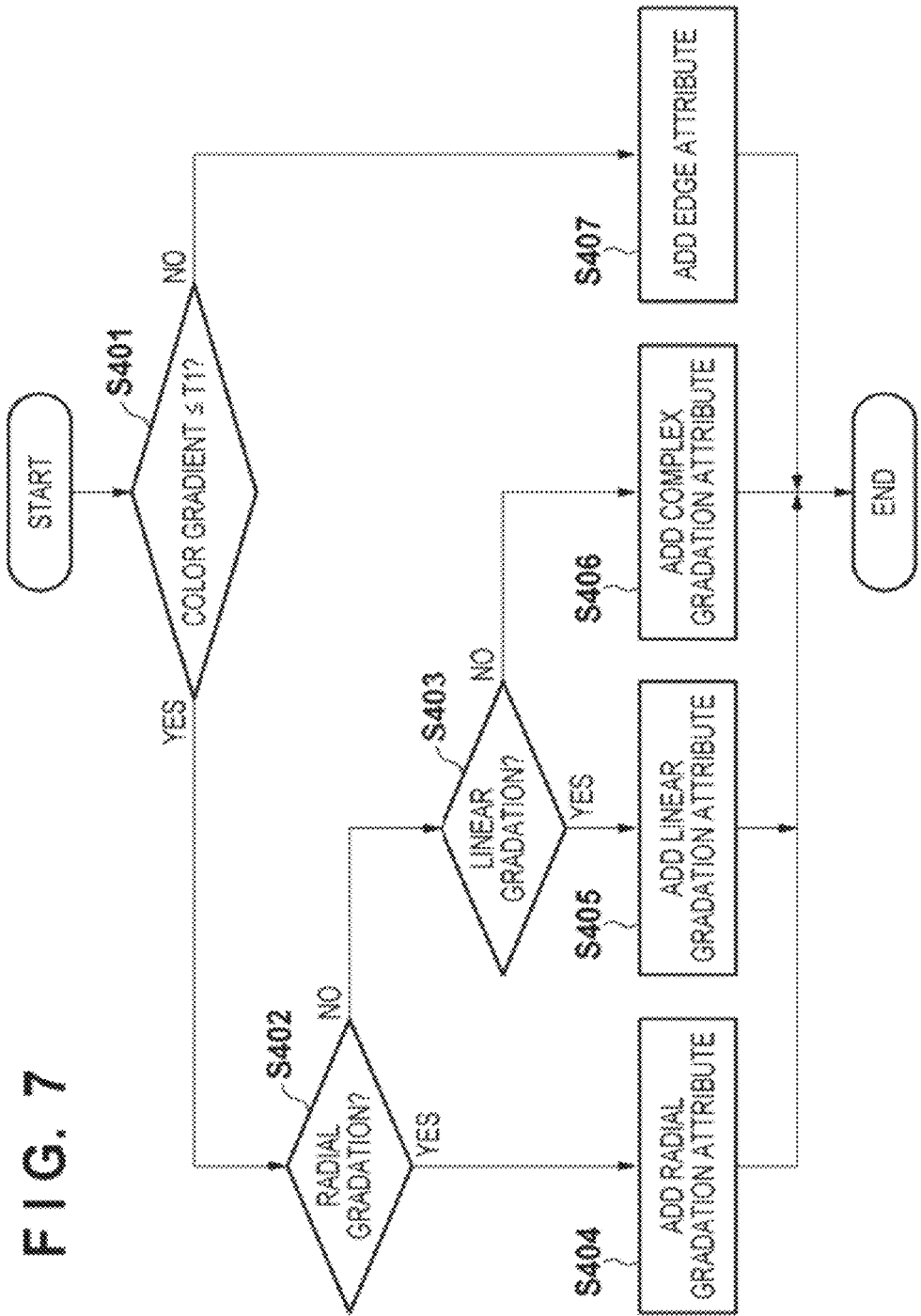
FIG. 7 is a flowchart showing an attribute determination processing sequence according to the first embodiment.

The boundary attribute is determined using the boundary color gradient information in step S400, and the attribute is added. More specifically, the determined attribute of each boundary is saved in association with each boundary of boundary color gradient information. A detailed sequence in step S400 will be explained with reference to FIG. 7.

In step S401, the CPU 7 determines, using boundary color gradient information, which of an edge boundary and pseudo contour boundary is a currently referred boundary. If the average color gradient in the boundary color gradient information obtained in the preceding steps is larger than a predetermined threshold T1, the CPU 7 determines that the currently referred boundary is an edge boundary. An example of the threshold T1 is T1=20. The threshold T1 may be obtained empirically or by an arbitrary calculation equation. If the average color gradient is equal to or smaller than the threshold T1, the CPU 7 determines that the currently referred boundary is a pseudo contour boundary. If the CPU 7 determines that the currently referred boundary is a pseudo contour boundary (YES in step S401), the process advances to step S402. If the CPU 7 determines that the currently referred boundary is an edge boundary (NO in step S401), the process advances to step S407. The "pseudo contour boundary" is a contour formed in a gradation within an image, and is used to divide the gradation region for processing.

In steps S402 and S403, the CPU 7 determines a gradation attribute. In this case, which of gradation regions, that is, a radial gradation, linear gradation, and complex gradation the currently referred pseudo contour boundary belongs to is determined using the characteristic of boundary color gradient information. The "radial gradation" is a gradation in which the color concentrically changes using a given point as a center point, as shown in 8a of FIG. 8. The "linear gradation" is a gradation in which the color changes in a predetermined direction, as shown in 9a and 9c of FIG. 9. The "complex gradation" is a gradation which belongs to neither the radial gradation nor linear gradation, as shown in 10a of FIG. 10.

Figure 8:
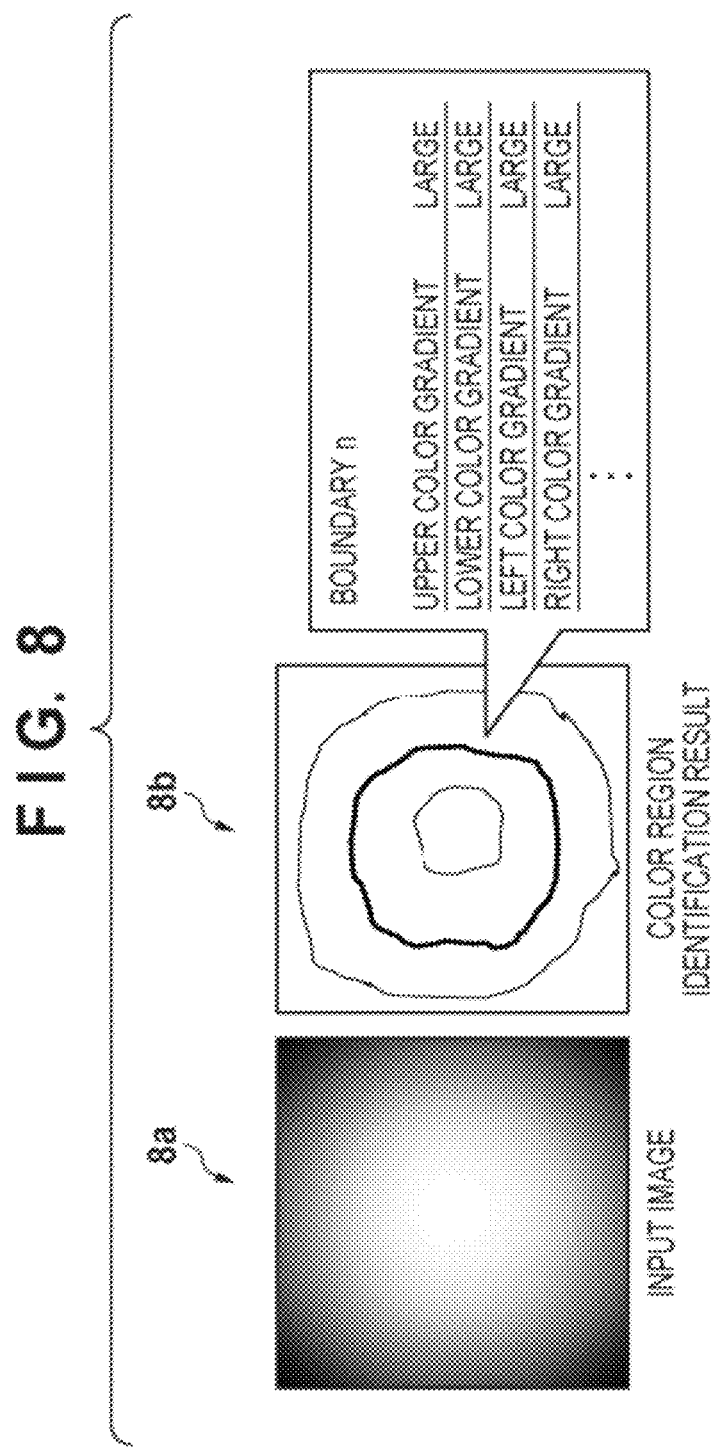
FIG. 8 is a view showing an input example of a radial gradation and the color region identification result according to the first embodiment.

In step S402, the CPU 7 determines whether the currently referred pseudo contour boundary belongs to the radial gradation. When color region identification processing (step S200) is performed for the radial gradation as shown in 8a of FIG. 8, a color region identification result as shown in 8b of FIG. 8 is obtained. Boundary color gradient information calculation processing (step S300) is executed based on the color region identification result to calculate the color gradient of each boundary. Then, color gradients calculated for each boundary take almost the same value in all the upper, lower, right, and left gradient directions, as shown in 8b of FIG. 8. This is because color gradients in the radial gradation take a constant value concentrically, that is, in all the gradient directions. By using this characteristic, if boundary color gradient information of the currently referred pseudo contour boundary satisfies all the following conditions, the CPU 7 determines in step S402 that the currently referred pseudo contour boundary has the radial gradation attribute:

upper color gradient×threshold $T2$>lower color gradient   condition 1:

lower color gradient×threshold $T2$>upper color gradient   condition 2:

right color gradient×threshold $T2$>left color gradient   condition 3:

left color gradient×threshold $T2$>right color gradient   condition 4:

upper color gradient×threshold $T2$>right color gradient   condition 5:

right color gradient×threshold $T2$>upper color gradient   condition 6:

If these six conditions are satisfied, it is considered that color gradients are almost the same in all the upper, lower, right, and left gradient directions of the pseudo contour boundary, and it is determined that the currently referred pseudo contour boundary has the radial gradation attribute. An example of the threshold T2 is T2=2. The threshold T2 may be obtained empirically or by an arbitrary calculation equation. If the CPU 7 determines that the currently referred boundary belongs to the radial gradation (YES in step S402), the process shifts to step S404. If the CPU 7 determines that the currently referred boundary does not belong to the radial gradation (NO in step S402), the process shifts to step S403.

Figure 9:
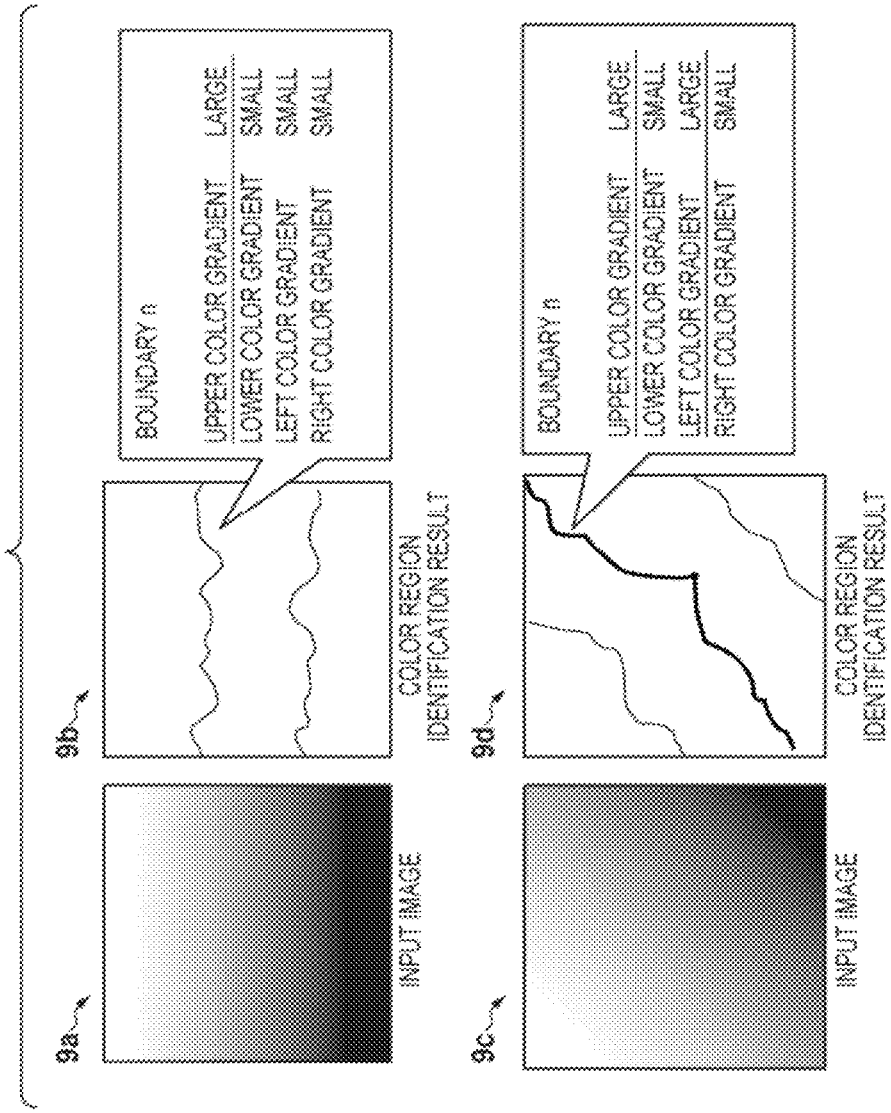
FIG. 9 is a view showing an input example of a linear gradation and the color region identification result according to the first embodiment.
Figure 10:
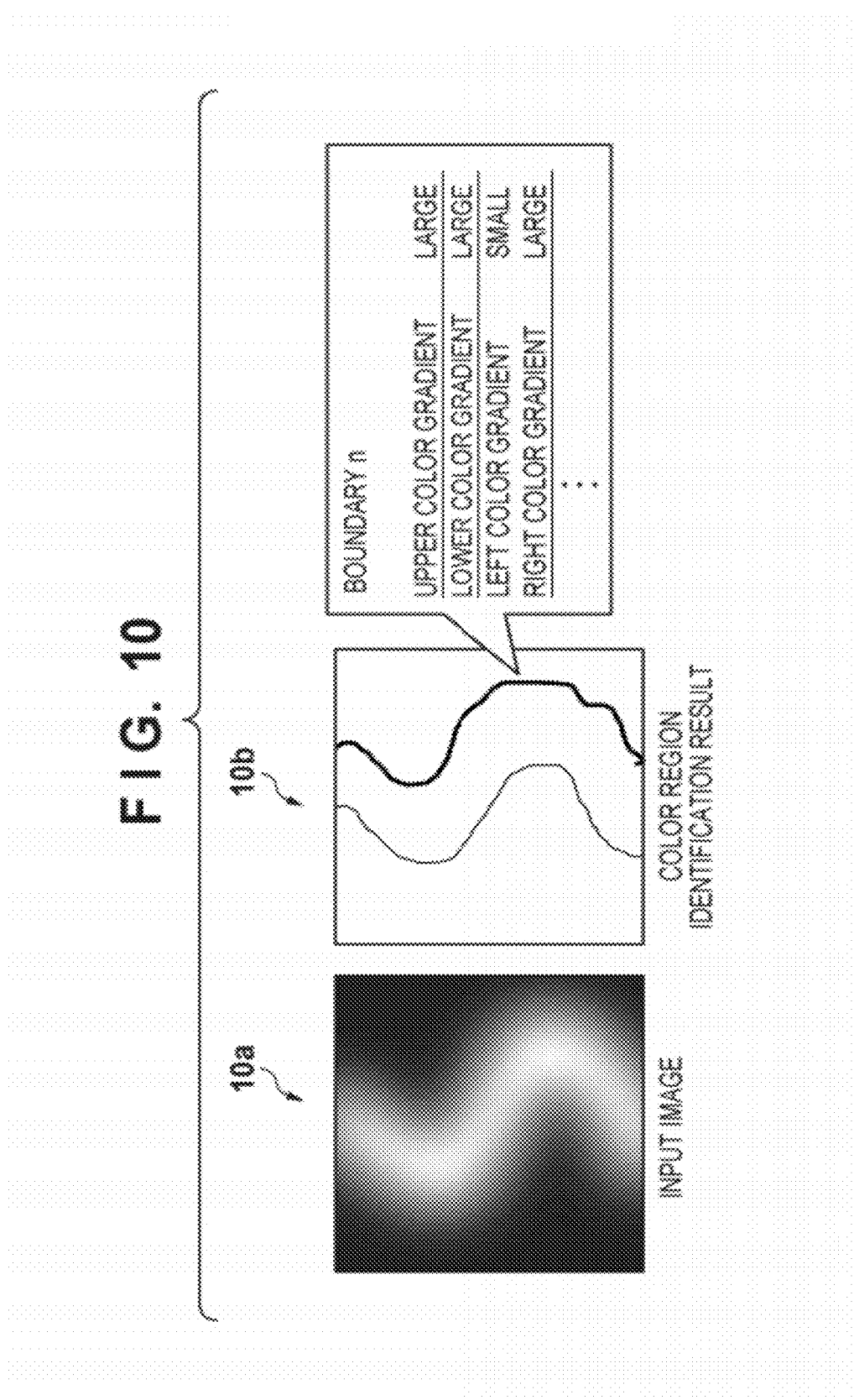
FIG. 10 is a view showing an input example of a complex gradation and the color region identification result according to the first embodiment.

In step S403, the CPU 7 determines whether the currently referred pseudo contour boundary has the linear gradation attribute. When a linear gradation is input, as shown in 9a of FIG. 9 or 9c of FIG. 9, a color region identification result as shown in 9b of FIG. 9 or 9d of FIG. 9 is obtained. Boundary color gradient information calculation processing is executed based on the color region identification result to calculate the color gradient of each boundary. Then, one gradient direction out of the upper, lower, right, and left color gradients as shown in 9b of FIG. 9, or two gradient directions which are not opposite to each other as shown in 9d of FIG. 9 take large values. This is because the color gradient of the linear gradation takes a predetermined gradient direction. By using this characteristic, if boundary color gradient information of the currently referred pseudo contour boundary satisfies either condition 7 (7.1 to 7.3) or condition 8 (8.1 to 8.5), the CPU 7 determines in step S403 that the currently referred pseudo contour boundary has the linear gradation attribute. Note that upper, lower, right, and left color gradients take values G1, G2, G3, and G4 in descending order.

condition 7.1: $G1$>threshold $T3 \times G2$ condition 7.2: $G1$>threshold $T3 \times G3$ condition 7.3: $G1$>threshold $T3 \times G4$   (Condition 7)

condition 8.1: $G1$>threshold $T4 \times G3$ condition 8.2: $G1$>threshold $T4 \times G4$ condition 8.3: $G2$>threshold $T4 \times G3$ condition 8.4: $G2$>threshold $T4 \times G4$ condition 8.5: $G1$ direction and $G2$ direction are not opposite to each other   (Condition 8)

Examples of the thresholds T3 and T4 are T3=3 and T4=2. The thresholds T3 and T4 may be obtained empirically or by arbitrary calculation equations. If either condition 7 or condition 8 is satisfied and the CPU 7 determines that the currently referred boundary belongs to the linear gradation (YES in step S403), the process shifts to step S405. If the CPU 7 determines that the currently referred boundary does not belong to a linear gradation (NO in step S403), the process shifts to step S406.

In each of steps S404, S405, S406, and S407, the determined attribute is added to boundary attribute information for each boundary. More specifically, in step S404, the CPU 7 adds the radial gradation attribute to the determination target boundary. In step S405, the CPU 7 adds the linear gradation attribute to the determination target boundary. In step S406, the CPU 7 adds the complex gradation attribute to the determination target boundary. In step S407, the CPU 7 adds the edge attribute to the determination target boundary. After the end of the processing in one of steps S404, S405, S406, and S407, the processing sequence ends. The processes in steps S401 to S407 implement boundary attribute determination processing (step S400) in FIG. 1.

[Gradation Cluster Information Generation Processing]

Figure 11:
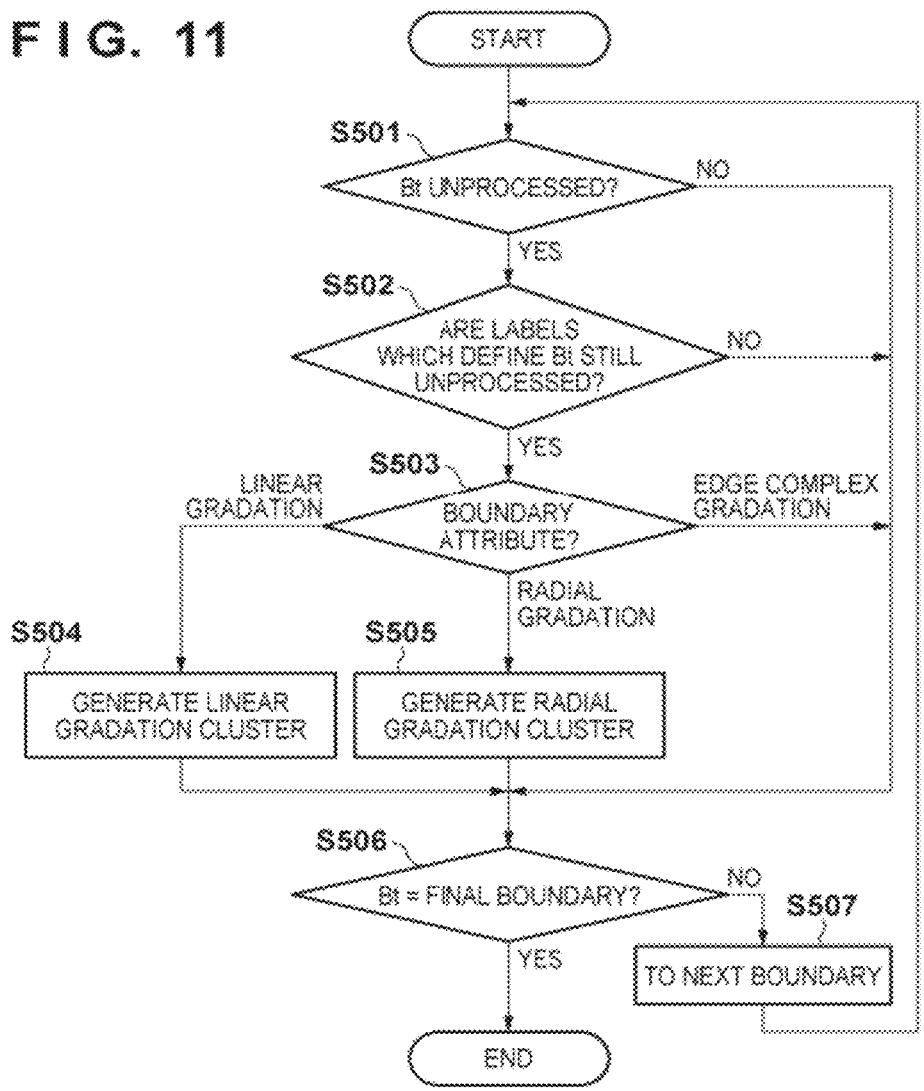
FIG. 11 is a flowchart showing a gradation cluster information generation processing sequence according to the first embodiment.

In step S500, a gradation region represented by a gradation of the same type (same attribute) is identified, and gradation cluster information generation processing is performed to generate cluster information corresponding to the gradation region. In the embodiment, the gradation cluster information includes a list of labels indicating color regions in a gradation region, a list of boundaries in the gradation region, and the type of corresponding gradation region. Details of step S500 will be explained with reference to a processing sequence in FIG. 11 by exemplifying a case in which an input image in 12a of FIG. 12 is input.

Figure 12:
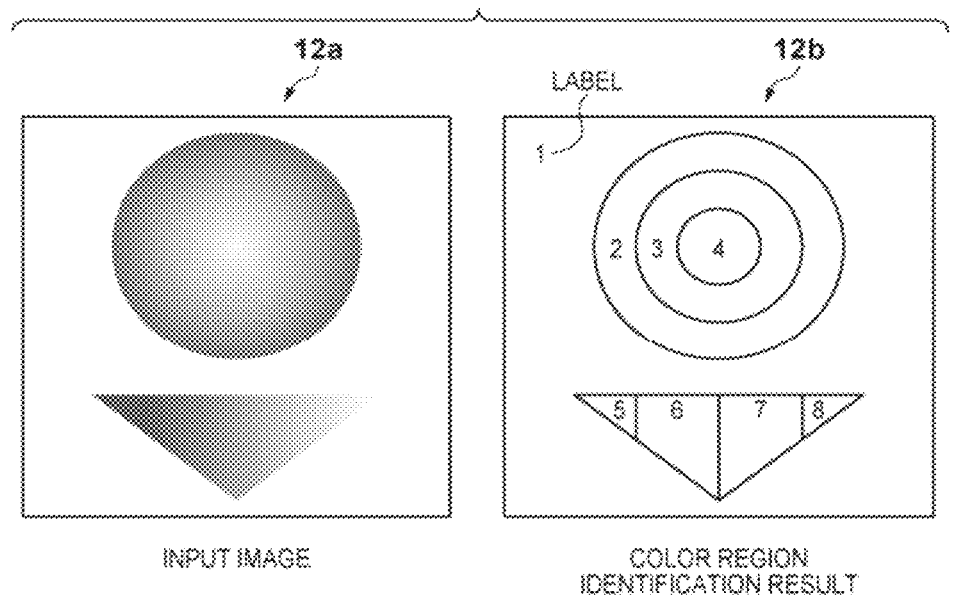
FIG. 12 is a view showing an example of gradation cluster information generation processing according to the first embodiment.

When the input image in 12a of FIG. 12 is input, a color region identification result shown in 12b of FIG. 12 is obtained by color region identification processing (step S200). This result undergoes boundary color gradient information calculation processing (step S300) and boundary attribute determination processing (step S400), obtaining information as shown in FIG. 13. A boundary of interest in input information will be referred to as Bt.

In step S501, the CPU 7 determines whether the currently referred boundary Bt is still unprocessed. This processing is necessary not to process again a processed boundary because there is a boundary which is processed preferentially in subsequent gradation cluster information generation processing. If the CPU 7 determines that the currently referred boundary Bt is still unprocessed (YES in step S501), the process shifts to step S502. If the CPU 7 determines that the currently referred boundary Bt has been processed (NO in step S501), the process shifts to step S506.

In step S502, the CPU 7 determines whether two label regions which define the currently referred boundary Bt are still unprocessed. Similar to step S501, this processing is necessary not to process again two labels which define a processed boundary because there is a boundary which is processed preferentially in subsequent gradation cluster information generation processing. If the CPU 7 determines that labels which define the boundary Bt (that is, two label regions which sandwich the boundary Bt) are still unprocessed (YES in step S502), the process shifts to step S503. If the CPU 7 determines that labels which define the boundary Bt have been processed (NO in step S502), the process shifts to step S506.

In step S503, the CPU 7 determines a boundary attribute. If an attribute associated with the currently referred boundary Bt is "linear gradation", the process shifts to step S504; if it is "radial gradation", to step S505; otherwise, to step S506.

In step S504, the CPU 7 generates linear gradation cluster information. First, the CPU 7 registers the boundary number of the currently referred boundary Bt in linear gradation cluster information. Then, the CPU 7 registers, in linear gradation cluster information, two labels which define the currently referred boundary Bt. The CPU 7 calculates a gradient angle specific to the generated linear gradation cluster information. The gradient angle at this time is obtained using upper, lower, right, and left color gradients in boundary color gradient information according to equation (1):

$$\text{gradient angle} = \arctan((\text{upper color gradient} - \text{lower color gradient})/(\text{right color gradient} - \text{left color gradient})) \quad (1)$$

The CPU 7 sets "linear gradation" in the type in the generated linear gradation cluster information. For convenience, the cluster of a boundary for which the linear gradation is set will be referred to as linear gradation cluster information G1.

When at least either of color regions corresponding to the two labels registered in the linear gradation cluster information further contacts still other color regions, the CPU 7 sequentially evaluates boundaries with the other color regions to determine whether to register the other color regions in the linear gradation cluster information. This processing will be described using an example in FIG. 13.

Assume that the currently referred boundary Bt is boundary 8 in FIG. 13. At this time, boundary 8, and label 5 and label 6 which define boundary 8 are registered in the linear gradation cluster information G1. The gradient angle in this case is obtained using the above-mentioned equation (1):

$$\text{gradient angle} = \arctan((0-0)/(800-0)) = 0$$

By referring to the boundary color gradient information in FIG. 13, it is determined that label 5 contacts boundary 4, in addition to currently referred boundary 8. It is determined whether boundary 4 belongs to the generated linear gradation cluster information G1. At this time, the boundary attribute of boundary 4 is the edge attribute, so it is determined that boundary 4 does not belong to the linear gradation cluster information G1.

Also, based on the boundary color gradient information in FIG. 13, it is determined that label 6 contacts boundary 5 and boundary 9, in addition to boundary 8. Although boundary 5 has the edge attribute and does not belong to the linear gradation cluster information G1, boundary 9 has the linear gradation attribute. Thus, it is determined whether boundary 9 belongs to the linear gradation cluster information G1. More specifically, it is determined whether label 6 and label 7 which define boundary 9 are contained in another gradation cluster information. If label 6 and label 7 are contained in another gradation cluster information, it is determined that boundary 9 does not belong to gradation cluster information during generation. If neither label 6 nor label 7 is contained in another gradation cluster information, the determination shifts to the next label. The gradient angle of boundary 9 can be calculated using equation (1). That is, the gradient angle of boundary 9 is calculated as follows:

$$\text{gradient angle} = \arctan((0-0)/(1200-0)) = 0$$

If the difference between the obtained gradient angle and a gradient angle specific to the linear gradation cluster information is equal to or smaller than a threshold T5, the boundary and labels which define it are registered in the linear gradation cluster information. An example of the threshold T5 is T5=22.5. The threshold T5 may be obtained empirically or by an arbitrary calculation equation. Since the difference between the gradient angle of boundary 9 in FIG. 13 and that of the linear gradation cluster information is 0, it is determined that boundary 9 belongs to the linear gradation cluster information G1. Thus, boundary 9, and label 6 and label 7 which define boundary 9 are registered in the linear gradation cluster information G1. However, label 6 has already been registered in the linear gradation cluster information during generation, so only label 7 is registered. Determination of whether the difference is larger than a predetermined threshold or is equal to or larger than the threshold can be changed in accordance with the threshold setting.

A boundary to which label 7 belongs is evaluated in the same way and registered as a linear gradation, obtaining the result such as gradation cluster 2 in gradation cluster information shown in FIG. 14. In the example of FIG. 14, gradation cluster 2 is a linear gradation which is formed from color regions of labels 5, 6, 7, and 8 and has a gradient angle of 0°. Note that the "type" shown in FIG. 14 corresponds to the gradation attribute of each boundary, and is the attribute of a gradation cluster. After generating the linear gradation cluster information by the above processing, the process shifts to step S506.

In step S505, the CPU 7 generates radial gradation cluster information. First, the CPU 7 registers the boundary number of the currently referred boundary Bt in radial gradation cluster information. Then, the CPU 7 registers, in gradation cluster information, two labels which define the currently referred boundary Bt. Since the generated radial gradation cluster information does not require a gradient angle, the CPU 7 substitutes a dummy value as an initial value. The CPU 7 sets "radial gradation" in the type in the generated radial gradation cluster information. For convenience, the cluster of a boundary for which the radial gradation is set will be referred to as radial gradation cluster information Gr.

When at least either of color regions corresponding to the two labels registered in the radial gradation cluster information further contacts still other color regions, the CPU 7 sequentially evaluates boundaries with the other color regions to determine whether to register the other color regions in the radial gradation cluster information. This processing will be explained using the example in FIG. 13.

Assume that the currently referred boundary Bt is boundary 2 in FIG. 13. At this time, boundary 2, and label 2 and label 3 which define boundary 2 are registered in the radial gradation cluster information Gr. By referring to the boundary color gradient information in FIG. 13, it is determined that label 2 contacts boundary 1, in addition to currently referred boundary 2. It is then determined whether boundary 1 belongs to the generated radial gradation cluster information Gr. At this time, the boundary attribute of boundary 1 is the edge attribute, so it is determined that boundary 1 does not belong to the radial gradation cluster information Gr.

Also, based on the boundary color gradient information in FIG. 13, it is determined that label 3 contacts boundary 3, in addition to currently referred boundary 2. Boundary 3 has the radial gradation attribute. It is therefore determined whether boundary 3 belongs to the radial gradation cluster information Gr. More specifically, it is determined whether label 3 and label 4 which define boundary 3 are contained in another gradation cluster information. If label 3 and label 4 are contained in another gradation information, it is determined that boundary 3 does not belong to gradation cluster information during generation. If neither label 3 nor label 4 is contained in another gradation cluster information, boundary 3, and labels which define boundary 3 are registered in the radial gradation cluster information Gr. However, label 3 has already been registered in the radial gradation cluster information during generation, so only label 4 is registered.

A boundary to which label 4 belongs is evaluated in the same way and registered as a radial gradation, obtaining the result such as gradation cluster 1 in gradation cluster information shown in FIG. 14. Gradation cluster 1 in FIG. 14 is registered as a radial gradation cluster formed from color regions of labels 2, 3, and 4. After generating the radial gradation cluster information by the above processing, the process shifts to step S506.

In step S506, the CPU 7 determines whether the currently referred boundary is the final boundary. If the currently referred boundary is the final boundary (YES in step S506), the process ends without any further processing; if it is not the final boundary (NO in step S506), shifts to step S507. In step S507, the CPU 7 updates the currently referred boundary to the next boundary, and the process returns to step S501. Steps S501 to S507 implement gradation cluster information generation processing (step S500) in FIG. 1.

[Gradation Parameter Generation Processing]

In step S600, gradation parameter generation processing is performed to generate gradation parameters for each gradation cluster information. In this case, the parameters of the linear gradation and radial gradation are generated using the color region identification result, gradation cluster information, and boundary color gradient information.

Details of a parameter generation method when the type in gradation cluster information is "linear gradation" will be explained. FIG. 15 is a conceptual view showing generation of parameters in, for example, the linear gradation region of FIG. 12. Linear gradation parameters to be generated are a start point ps and end point pe which define gradation end points, and an offset which defines a change of color. Note that the offset contains an offset value indicating a relative position in a gradation region as position information, and a color value which defines a color at the relative position.

First, the circumscribed rectangle R of a linear gradation region (region defined by labels registered in linear gradation cluster information) is obtained, and the gravity center C of the circumscribed rectangle R is obtained. Note that a description of the gravity center obtaining method will be omitted. Then, a vector v which passes through the obtained gravity center C and has a gradient angle added to gradation cluster information as the angle θ is obtained. Intersection points with the circumscribed rectangle R are defined as the start point ps(a, b) and the end point pe(c, d). The distance from the obtained start point ps to end point pe is obtained, and a constant K for normalization which assumes this distance to be 100 is obtained. The constant K can be obtained using equation (2):

$$K = \frac{100}{\sqrt{(c-a)^2 + (d-b)^2}} \quad (2)$$

In the example shown in FIG. 15, the constant K for normalization is given by $$K = \frac{100}{\sqrt{(300-100)^2 + (100-100)^2}} = 0.5$$

Thereafter, the gravity centers Cln (n=1, 2, ..., N) of color regions corresponding to respective labels are obtained for N labels registered in gradation cluster information. In the example shown in FIG. 15, C11 to C14 are contained. Then, normals are dropped to the vector v from the obtained gravity centers Cln of the respective color regions, and intersection points are derived as offset points Ofn (n=1, 2, ..., N). In the example shown in FIG. 15, Of1 to Of4 are contained. Distances dn (n=1, 2, ..., N) from the start point ps to the offset points Ofn are calculated, and values obtained by multiplying the distances dn by the above-described constant K are set as offset values at the offset points Ofn.

In the example of FIG. 15, the distance d1 between Of1 (140, 100) and ps(100, 100) is 40. Since the constant K is 0.5, as described above, the offset value at Of1 is 0.5×40=20. Finally, the average color of a color region corresponding to the offset point Ofn is used as the color value of the offset. In the example of FIG. 15, the above-described processing is executed for all offset points Ofn, obtaining linear gradation parameters as exemplified in FIG. 16. As shown in FIG. 16, in the embodiment, the linear gradation parameters include end point information (coordinates of start and end points) of the gradation, and information (offset value and color value) of each offset.

Details of a parameter generation method when the type in gradation cluster information is "radial gradation" will be explained. FIG. 17 is a conceptual view showing generation of parameters in, for example, the radial gradation region of FIG. 12. Radial gradation parameters to be generated are a center point pc and radius r which define gradation end points, and an offset which defines a change of color. Note that the offset contains an offset value indicating a relative position in a gradation region as position information, and a color value which defines a color at the relative position.

First, the circumscribed rectangles of respective color regions corresponding to N labels registered in radial gradation cluster information are obtained and sorted as Rn (n=1, 2, . . . , N) in the size order. In the example of FIG. 17, the circumscribed rectangles are R1, R2, and R3.

The obtained circumscribed rectangle R1 is a circumscribed rectangle corresponding to an innermost color region. The gravity center of the corresponding color region is obtained and defined as the center point pc of the radial gradation. The obtained circumscribed rectangle RN is a circumscribed rectangle corresponding to an outermost color region. The distance to the center point pc from a straight line LRN which defines the right end of the circumscribed rectangle is set as the radius r. In the example of FIG. 17, the distance from the center point pc(200, 100) to the straight line LR3 (x=280) which defines the right end of the circumscribed rectangle R3 of the outermost color region is 80, and this value is set as the radius r.

After that, the constant K for normalization which assumes this radius r to be 100 is obtained. The constant K can be obtained using equation (3):

$$K = \frac{100}{r} \quad (3)$$

In the example of FIG. 17, the constant K for normalization is given by $$K = \frac{100}{80} = 1.25$$

Then, the offset Ofn (n=1, 2, . . . , N) of the radial gradation is obtained. As for the offset in the radial gradation, the first offset point Of1 is set as the same point as the center point pc, and the offset value is set to 0. A method of generating offset points from the second offset point will be explained.

A straight line Lc which passes through the center point pc and is parallel to the x-axis is defined. Assuming that an offset point during generation is the ith offset point (i=2, 3, . . . , N), a straight line Lmi which passes through a middle point between a straight line LRi−1 that defines the right end of a circumscribed rectangle Ri−1 and a straight line LRi that defines the right end of a circumscribed rectangle Ri is calculated. Then, the intersection point between the obtained straight line Lmi and the straight line Lc is obtained and set as the offset point Ofi. In the example of FIG. 17, the straight line Lc which passes through the center point pc(200, 100) and is parallel to the x-axis is y=100. For i=2, the straight line Lm2 which passes through a middle point between the straight line LR1 (x=220) and the straight line LR2 (x=260) is x=240. Hence, the offset point Of2 is the intersection point (240, 100) between the straight lines Lc and Lm2. By this processing, offset points Ofn are generated by the number N of labels. In the example shown in b of FIG. 17, Of1 to Of3 are contained.

Then, distances dn (n=1, 2, . . . , N) from the start point pc to the offset points Ofn are calculated, and values obtained by multiplying the distances dn by the above-described constant K are set as offset values. In the example of FIG. 17, since Of1 is the same point as the center point pc, the distance d1=0 and the offset value is 0 regardless of the constant K. The distance d2 between Of2(240, 100) and the center point pc(200, 100) is 40. Since the constant K is 1.25, as described above, the offset value at Of2 is 1.25×60=50. Finally, the average color of a color region corresponding to the offset point Ofn is used as the color value of the offset.

The above-described processing is executed for all offset points Ofn, obtaining radial gradation parameters as exemplified in FIG. 18. As shown in FIG. 18, in the embodiment, the radial gradation parameters include the center point coordinates and radius of the radial gradation, and information (offset value and color value) of each offset. The above processing implements gradation parameter generation processing (step S600) in FIG. 1.

[Color Region Integration Processing]

In step S700, color region integration processing is performed to integrate color regions indicated by labels into one for each gradation cluster information. In this processing, labels registered in each gradation cluster information are integrated into one, obtaining a new color region identification result. This will be described with reference to FIGS. 12 and 14. Labels 2, 3, and 4 are registered in gradation cluster 1. Color regions indicated by these labels are integrated into one color region, and label 9 is assigned as a new label to it. Similarly, labels 5, 6, 7, and 8 registered in gradation cluster 2 are integrated, and label 10 is assigned as a new label. This processing generates label-assigned color regions as shown in FIG. 19, removing a pseudo contour boundary which does not exist in the original image. Gradation cluster information reveals that label 9 is a radial gradation region and label 10 is a linear gradation region. This processing implements color region integration processing (step S700) in FIG. 1.

[Vectorization Target Determination]

Figure 20:
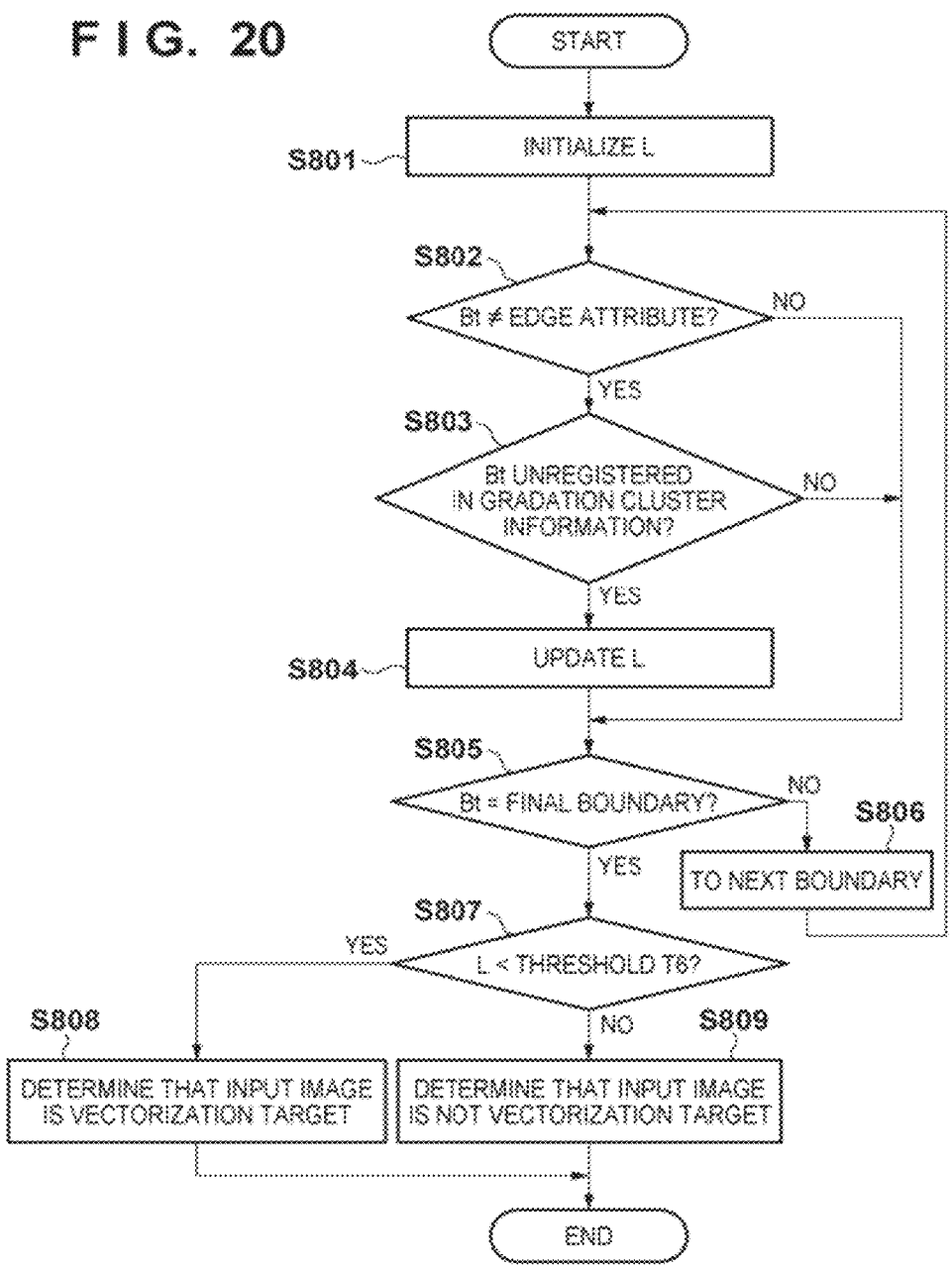
FIG. 20 is a flowchart showing a vectorization target determination processing sequence according to the first embodiment.

In step S800, vectorization target determination is performed using the boundary color gradient information, boundary attribute information, and gradation cluster information to determine whether the image during processing is a vectorization target. A boundary which does not have the edge attribute but does not belong to gradation cluster information will be referred to as a "remaining pseudo contour". In this step, remaining pseudo contours are determined, and vectorization target determination is executed using a value L obtained by adding the boundary lengths of all the remaining pseudo contours. Details of step S800 will be explained with reference to FIG. 20.

In step S801, the CPU 7 initializes the boundary length value L of the remaining pseudo contour to "0". After the end of this processing, the process shifts to step S802. In step S802, the CPU 7 determines whether the boundary attribute of the currently referred boundary Bt is not the edge attribute. If the boundary attribute of the boundary Bt is the edge attribute (NO in step S802), the process shifts to step S805; if it is not the edge attribute (YES in step S802), to step S803.

In step S803, the CPU 7 determines whether the boundary number of the currently referred boundary Bt has been unregistered in the gradation cluster information. If the boundary number has been registered in the gradation cluster information (NO in step S803), the process shifts to step S805; if it has not been registered (YES in step S803), to step S804. In step S804, the CPU 7 adds the boundary length of the currently referred boundary Bt to the boundary length value L of the remaining pseudo contour. The process then shifts to step S805.

In step S805, the CPU 7 determines whether the currently referred boundary Bt is the final boundary. If the currently referred boundary Bt is the final boundary (YES in step S805), the process shifts to step S807; if it is not the final boundary (NO in step S805), to step S806. In step S806, the CPU 7 updates the currently referred boundary Bt to the next boundary, and the process returns to step S802.

In step S807, the CPU 7 determines whether the value L obtained by adding the boundary lengths of all remaining pseudo contours is smaller than a predetermined threshold T6. That is, the CPU 7 determines whether L serving as the sum of the boundary lengths of remaining pseudo contours is smaller than a predetermined threshold. If L is smaller than the threshold T6 (YES in step S807), the process shifts to step S808, the CPU 7 determines that the image during processing is a vectorization target, and the process ends. If L is equal to or larger than the threshold T6 (NO in step S807), the process shifts to step S809, the CPU 7 determines that the image during processing is not a vectorization target, and the process ends. An example of the threshold T6 used here is T6=input image height×input image width/2. The threshold T6 may be obtained empirically or by another calculation equation. By the above processing, it can be determined whether the image during processing is a vectorization target.

[Example in Determination Processing]

This processing will be explained using an example of FIGS. 12, 13, and 14. 12a of FIG. 12 represents an input image, and 12b of FIG. 12 represents the color region identification result of the input image. FIG. 13 shows boundary color gradient information and the boundary attribute in FIG. 12. FIG. 14 shows gradation cluster information generated based on FIG. 13. The threshold T6 is set to "100". This condition will be referred to as "example 1" for convenience.

In example 1, all boundaries not having the edge attribute shown in FIG. 13 are registered in the gradation cluster information, as shown in FIG. 14. After the processes in steps S801 to S806, the boundary length value L of the remaining pseudo contour remains unchanged from the initial value "0". In step S807, L is compared with the threshold T6. Since L=0 and T6=100, L<T6. It is determined that the input image in example 1 is a vectorization target.

This processing will be explained using another example of FIGS. 21, 22, and 23. 21a of FIG. 21 represents an input image, 21b of FIG. 21 represents the color region identification result of the input image, and 21c of FIG. 21 represents the color region integration result. FIG. 22 shows boundary color gradient information and the boundary attribute in FIG. 21. FIG. 23 shows gradation cluster information generated based on FIG. 22. The threshold T6 is set to "100". This condition will be referred to as "example 2" for convenience.

Referring to FIGS. 22 and 23, boundaries of boundary numbers 8, 9, and 10 do not have the edge attribute, but are not registered in the gradation cluster information. As is apparent from 21b of FIG. 21, of these boundaries, boundaries of boundary numbers 8 and 9 are boundaries of a complex gradation, and cannot undergo vectorization of linear and radial gradations. Thus, these boundaries are not registered even in the gradation cluster information, and are determined as "remaining pseudo contours".

To the contrary, boundary 10 is determined to have the radial gradation attribute, but is not registered in the gradation cluster information owing to gradation cluster generation processing in step S500. In step S500, when generating gradation cluster information, color regions adjacent to registered color regions are sequentially evaluated to determine whether to register the color region in the same gradation cluster. By this processing, a color region of label 4 in 21b of FIG. 21 is registered in a linear gradation cluster, generation of which starts first. In step S505, when generating radial gradation cluster information, boundary 10 having the radial gradation attribute is not registered in the radial gradation cluster because label 4 which defines boundary 10 has already been integrated into another gradation cluster information. For this reason, when different gradation regions coexist, even a boundary whose boundary attribute is a linear gradation or radial gradation, such as boundary 10 in 21c of FIG. 21, may be determined as a remaining pseudo contour. In example 2, after the processes in steps S801 to S806, the sum "700" of boundary lengths of boundary numbers 8, 9, and 10 is obtained as the boundary length value L of the remaining pseudo contour.

In step S807, L is compared with the threshold T6. Since L=700 and T6=100, L>T6. It is determined that the input image in example 2 is not a vectorization target.

The above processing implements vectorization target determination processing (step S800) in FIG. 1. If it is determined in this processing that the input image is a vectorization target (YES in step S800), the process shifts to step S900. If it is determined that the input image is not a vectorization target (NO in step S800), the process ends without any further processing.

[Contour Vector Description Generation Processing]

Finally in step S900 of FIG. 1, contour vector description generation processing is performed to generate the contour vector description of a color region. A color region for which the contour vector is to be obtained is a color region obtained after color region integration in step S700. First, the boundary between color regions after integration in step S700 is obtained and approximated by a function, generating a vector description (contour vector data) representing the contour of each color region. When the vector description is obtained by approximating a boundary by a function for each section in which adjacent color regions contact each other, a contour vector description free from a gap or overlap between the adjacent color regions can be obtained. In the example of FIG. 19, the boundary between color regions of label 1 and label 9, and that between color regions of label 1 and label 10 are obtained and approximated by a function, obtaining the contour vector descriptions of the respective color regions.

For a gradation region belonging to a gradation cluster, the obtained contour vector description of the color region, and the gradation parameters which have been obtained in step S600 to represent a gradation by a vector are output together. That is, vector data of an image containing a gradation (gradated contour vector data) is generated by describing the inside of a contour defined by the contour vector description of the color region so that the gradation is represented by the gradation parameters. For a color region (color region of a single color surrounded by a boundary having the edge attribute) other than the gradation region, the contour vector description of the color region and the representative color within the color region (for example, the average color of pixels contained in the color region) are output together, generating vector data of the color region other than the gradation region.

As described above, the present invention can determine whether an image is a vectorization target, and selectively vectorize an image suited to vectorization.

Second Embodiment

In the first embodiment, a boundary of a non-edge attribute which is not registered in gradation cluster information is determined as a remaining pseudo contour, and vectorization target determination uses the value L obtained by adding the boundary lengths of all remaining pseudo contours. However, a boundary determined to belong to a complex gradation in attribute determination processing according to the first embodiment is not integrated in subsequent processing. Hence, the boundary determined to belong to the complex gradation is finalized as a remaining pseudo contour at that time. By using this, vectorization target determination processing can be executed immediately after boundary attribute determination processing. In the second embodiment, vectorization target determination is performed using a boundary determined to belong to a complex gradation in attribute determination processing.

[Processing Sequence]

Figure 24:
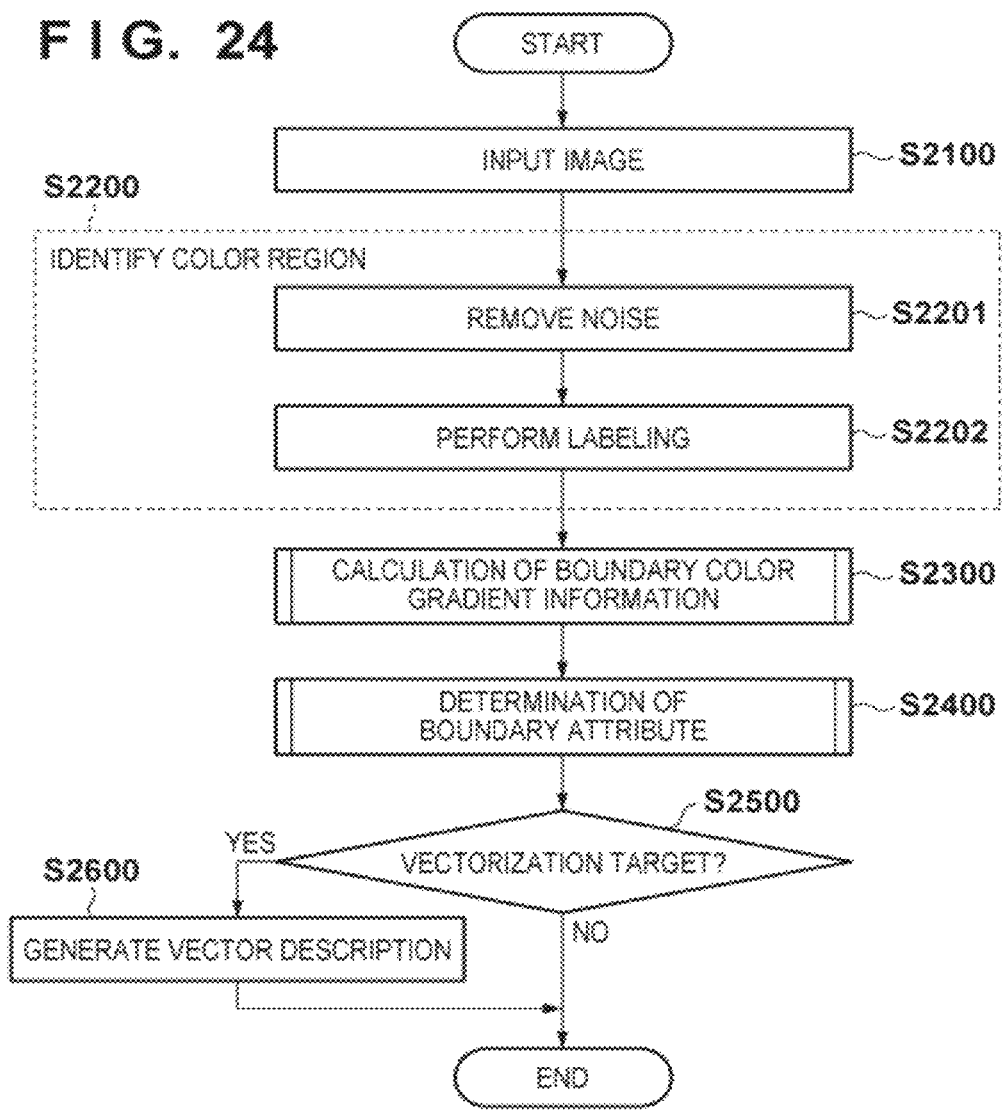
FIG. 24 is a flowchart showing main processing according to the second embodiment.

FIG. 24 shows a main processing sequence in the second embodiment. This processing sequence is implemented by executing a program stored in a storage unit by a CPU 7. Note that the same processes as those in steps S100 to S400 in FIG. 1 described in the first embodiment are executed in steps S2100 to S2400 shown in FIG. 24, and a description thereof will not be repeated.

In step S2500, the CPU 7 performs vectorization target determination. First, the CPU 7 determines that a boundary determined in step S2400 to have the complex gradation attribute is a remaining pseudo contour, and obtains a value L' which is the sum of the boundary lengths of all remaining pseudo contours. Then, similar to step S800 described in the first embodiment, the CPU 7 compares L' with a predetermined threshold T7. If the CPU 7 determines that L' is smaller than T7, it determines that the image during processing is a vectorization target (YES in step S2500), and the process shifts to step S2600. If the CPU 7 determines that L' is equal to or larger than T7, it determines that the image during processing is not a vectorization target (NO in step S2500), and the process ends without any further processing. An example of an equation for obtaining the threshold T7 is T7=input image height×input image width/3. The threshold T7 may be obtained empirically or by another calculation equation.

Finally in step S2600, the same processes as those in steps S500, S600, S700, and S900 in the first embodiment are performed, vectorizing the input image.

By the above processing, vectorization target determination can be executed after the end of attribute determination processing. When it is determined that an input image is not a vectorization target, subsequent processing can be skipped, increasing the processing speed.

Third Embodiment

In the first and second embodiments, vectorization target determination is performed using the boundary lengths of remaining pseudo contours. However, vectorization target determination can be performed not using the lengths of remaining pseudo contours but using the number of boundaries of remaining pseudo contours. A detailed vectorization target determination processing sequence in the third embodiment will be explained with reference to FIG. 25. This processing corresponds to the processing described with reference to FIG. 20 in the first embodiment. For descriptive convenience, processes other than vectorization target determination are the same as those in the first embodiment. This processing sequence is implemented by executing a program stored in a storage unit by a CPU 7.

In step S3801, the CPU 7 initializes the number N of boundaries of remaining pseudo contours to "0", and the process shifts to step S3802. In step S3802, the CPU 7 determines whether the boundary attribute of the currently referred boundary Bt is not the edge attribute. If the boundary attribute of the boundary Bt is the edge attribute (NO in step S3802), the process shifts to step S3805; if it is not the edge attribute (YES in step S3802), to step S3803.

In step S3803, the CPU 7 determines whether the boundary number of the currently referred boundary Bt has been unregistered in gradation cluster information. If the boundary number has been registered in the gradation cluster information (NO in step S3803), the process shifts to step S3805; if it has not been registered (YES in step S3803), to step S3804. In step S3804, the CPU 7 increments the number N of boundaries of remaining pseudo contours by one, and the process shifts to step S3805.

In step S3805, the CPU 7 determines whether the currently referred boundary Bt is the final boundary. If Bt is the final boundary (YES in step S3805), the process shifts to step S3807; if it is not the final boundary (NO in step S3805), to step S3806. In step S3806, the CPU 7 updates the currently referred boundary Bt to the next boundary, and the process returns to step S3802.

In step S3807, the CPU 7 determines whether the number N of boundaries of all remaining pseudo contours is smaller than a predetermined threshold T8. If N is smaller than the threshold T8 (YES in step S3807), the process shifts to step S3808, the CPU 7 determines that the image during processing is a vectorization target, and the process ends. If N is equal to or larger than the threshold T8 (NO in step S3807), the process shifts to step S3809, the CPU 7 determines that the image during processing is not a vectorization target, and the process ends. The threshold T8 can be defined by, for example, T8=0, 1, and input image height×input image/ 10000 (fractional portion is discarded).

By the above processing, whether an image during processing is a vectorization target can be determined using the number of boundaries of remaining pseudo contours.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-104742, filed May 9, 2011, which is hereby incorporated by reference herein in its entirety.

What is claimed is:

1. An image processing apparatus comprising:
a classifying unit constructed to classify pixels whose values are the same or similar in an input image into a same group, and classify pixels whose values are neither the same nor similar in the input image into different groups;
a color gradient information calculation unit constructed to calculate color gradient information at pixels of a boundary between groups classified as different groups, wherein the color gradient information calculation unit does not calculate color gradient information at pixels except the boundary;

an attribute determination unit constructed to determine a gradation attribute representing a characteristic of a color gradient at the boundary using the calculated color gradient information;

a vectorization target determination unit configured to determine, based on the gradation attribute of the boundary determined by said attribute determination unit, whether the input image is a vectorization target.

2. The apparatus according to claim 1, wherein the gradation attribute of the boundary includes one of an edge attribute in which an intensity of the color gradient at the boundary is larger than a predetermined threshold, a linear gradation attribute in which the color gradient at the boundary is constant in one direction or two directions not opposite to each other, a radial gradation attribute in which the color gradient at the boundary is constant in all directions, and a complex gradation attribute in which the boundary belongs to none of the edge attribute, the linear gradation attribute, and the radial gradation attribute.

3. The apparatus according to claim 2, further comprising a gradation cluster information generation unit configured to generate a gradation cluster by determining color regions belonging to the same gradation among the plurality of color regions using the gradation attribute of the boundary, and to generate gradation cluster information including information about color regions belonging to the gradation cluster, a boundary between the color regions belonging to the gradation cluster, and a gradation type of the gradation cluster, wherein said vectorization target determination unit determines, based on the gradation cluster information and the gradation attribute of the boundary, whether the input image is a vectorization target.

4. The apparatus according to claim 3, wherein when a sum of lengths of boundaries which have a gradation attribute other than the edge attribute and are not contained in the gradation cluster information is smaller than a predetermined threshold, said vectorization target determination unit determines that the input image is a vectorization target, and when the sum is not smaller than the predetermined threshold, that the input image is not a vectorization target.

5. The apparatus according to claim 2, wherein when a sum of lengths of boundaries determined to have the complex gradation attribute is smaller than a predetermined threshold, said vectorization target determination unit determines that the input image is a vectorization target, and when the sum is not smaller than the predetermined threshold, that the input image is not a vectorization target.

6. The apparatus according to claim 2, wherein when the number of boundaries determined to have the complex gradation attribute is smaller than a predetermined threshold, said vectorization target determination unit determines that the input image is a vectorization target, and when the number is not smaller than the predetermined threshold, that the input image is not a vectorization target.

7. The apparatus according to claim 1, further comprising:

a unit configured to execute subtractive color processing for the input image by changing similar pixel values in the input image to same pixel values, wherein the classifying unit is constructed to classify, into a same group, pixels including same pixel values in the input image which is applied the subtractive color processing.

8. An image processing apparatus comprising:

a classifying unit configured to classify pixels whose values are the same or similar in an input image into a same group, and classify pixels whose values are neither the same nor similar in the input image into different groups;

a calculation unit configured to calculate color gradient information at pixels of a boundary between groups classified as different groups, wherein the calculation unit does not calculate color gradient information at pixels except the boundary; and a vectorization target determination unit configured to determine, based on the calculated color gradation information, whether the input image is a vectorization target.

9. An image processing apparatus comprising:

a classifying unit configured to classify pixels whose values are the same or similar in an input image into a same group, and classify pixels whose values are neither the same nor similar in the input image into different groups;

a calculation unit configured to calculate color gradient information up and down, left and right at pixels of a boundary between groups classified as different groups, wherein the calculation unit does not calculate color gradient information at pixels except the boundary;

a determination unit configured to determine whether the gradient information calculated in the four directions is similar with each other; and a vectorization target determination unit configured to determine that the input image is a vectorization target if the gradient information calculated in the four directions is determined to be similar with each other.

* * * * *